United States Patent
Racz et al.

(10) Patent No.: US 12,418,410 B2
(45) Date of Patent: *Sep. 16, 2025

(54) SECURE LAYERED ENCRYPTION OF DATA STREAMS

(71) Applicant: GENETEC INC., St-Laurent (CA)

(72) Inventors: Pierre Racz, Montreal (CA); Frederic Rioux, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,365

(22) Filed: Jun. 25, 2024

(65) Prior Publication Data

US 2024/0348428 A1    Oct. 17, 2024

Related U.S. Application Data

(63) Continuation of application No. 18/306,294, filed on Apr. 25, 2023, now Pat. No. 12,058,245, which is a
(Continued)

(51) Int. Cl.
*H04L 9/08* (2006.01)
*G08B 13/196* (2006.01)
(Continued)

(52) U.S. Cl.
CPC .......... *H04L 9/0825* (2013.01); *G08B 13/196* (2013.01); *G08B 13/19667* (2013.01);
(Continued)

(58) Field of Classification Search
CPC ......... H04L 9/0825; H04L 9/065; H04L 9/14; H04L 9/30; H04L 63/0435;
(Continued)

(56) References Cited

U.S. PATENT DOCUMENTS

| | | |
|---|---|---|
| 5,757,909 A | 5/1998 | Park |
| 6,052,466 A | 4/2000 | Wright |

(Continued)

FOREIGN PATENT DOCUMENTS

| | | |
|---|---|---|
| CA | 2354351 A | 3/2002 |
| EP | 1062812 A1 | 12/2000 |

(Continued)

OTHER PUBLICATIONS

Shukla et al., "Secure Multi-Party Computation Protocol Using Asymmetric Encryption", Mar. 2014, International Conference on Computing for Sustainable Global Development, pp. 780-785 (Year: 2014).*

(Continued)

*Primary Examiner* — Kenneth W Chang
(74) *Attorney, Agent, or Firm* — Anglehart et al.

(57) ABSTRACT

Technology permitting secure storage and transmission of data stream as well as tiered access to multiple data stream according to permission. Data streams may be encrypted using symmetric encryption performed with varying symmetric keys according to a key stream of symmetric keys. Native data may be discarded for safety. Whole or partial key streams may be encrypted using the public keys of authorized entities having permission to access respective data streams or portions thereof. Only the corresponding private keys can decrypt the encrypted key streams required to decrypt the encrypted data streams. Thus rigorous access control is provided. IT personnel accessing data stream files on a server or intruders maliciously obtaining files will not be able to derive the data stream. Sensitive data streams may be stored using cloud services despite inherent risks.

21 Claims, 13 Drawing Sheets

Related U.S. Application Data continuation of application No. 17/212,312, filed on Mar. 25, 2021, now Pat. No. 11,671,247, which is a continuation of application No. 15/776,448, filed as application No. PCT/CA2016/051350 on Nov. 18, 2016, now Pat. No. 10,992,461.

(60) Provisional application No. 62/258,022, filed on Nov. 20, 2015.

(51) Int. Cl.
    *H04L 9/06*    (2006.01)
    *H04L 9/14*    (2006.01)
    *H04L 9/30*    (2006.01)
    *H04L 9/40*    (2022.01)

(52) U.S. Cl.
CPC .............. *H04L 9/065* (2013.01); *H04L 9/14* (2013.01); *H04L 9/30* (2013.01); *H04L 63/0435* (2013.01); *H04L 2209/60* (2013.01); *H04L 2209/601* (2013.01)

(58) Field of Classification Search
CPC .......... H04L 2209/60; H04L 2209/601; G08B 13/196; G08B 13/19667
See application file for complete search history.

(56) References Cited

U.S. PATENT DOCUMENTS

| | | |
|---|---|---|
| 6,415,326 B1 | 7/2002 | Gupta et al. |
| 7,242,772 B1 | 7/2007 | Tehranchi |
| 8,332,527 B2 | 12/2012 | Yan et al. |
| 8,712,045 B2 | 4/2014 | Dubhashi et al. |
| 8,891,773 B2 | 11/2014 | Henze et al. |
| 9,754,625 B2 | 9/2017 | Lau et al. |
| 2004/0005061 A1 | 1/2004 | Buer et al. |
| 2004/0109569 A1 | 6/2004 | Ellison et al. |
| 2005/0081031 A1 | 4/2005 | Peterson |
| 2005/0180573 A1 | 8/2005 | Pelly et al. |
| 2005/0204038 A1 | 9/2005 | Medvinsky et al. |
| 2006/0093150 A1 | 5/2006 | Reddy et al. |
| 2006/0161791 A1* | 7/2006 | Bennett ................... G06F 21/40 713/193 |
| 2006/0259433 A1 | 11/2006 | Lahtinen et al. |
| 2007/0005795 A1 | 1/2007 | Gonzalez |
| 2007/0220279 A1 | 9/2007 | Northcutt et al. |
| 2008/0005130 A1 | 1/2008 | Logan et al. |
| 2008/0034205 A1* | 2/2008 | Alain ....................... G06F 21/00 713/160 |
| 2008/0034276 A1 | 2/2008 | Ficco |
| 2008/0219436 A1 | 9/2008 | Chen et al. |
| 2008/0263363 A1* | 10/2008 | Jueneman .............. H04L 9/0877 713/184 |
| 2009/0154705 A1 | 6/2009 | Price, III et al. |
| 2009/0161869 A1 | 6/2009 | Chow et al. |
| 2011/0072037 A1 | 3/2011 | Lotzer |
| 2011/0138486 A1 | 6/2011 | White |
| 2011/0231660 A1 | 9/2011 | Kanungo |
| 2012/0072723 A1 | 3/2012 | Orsini et al. |
| 2012/0272051 A1 | 10/2012 | Chittigala et al. |
| 2013/0013931 A1 | 1/2013 | O'Hare et al. |
| 2013/0254539 A1* | 9/2013 | Auradkar ............ G06F 21/6209 713/165 |
| 2013/0290845 A1 | 10/2013 | Rudman et al. |
| 2013/0318347 A1 | 11/2013 | Moffat |
| 2013/0343720 A1 | 12/2013 | Abecassis |
| 2014/0164776 A1* | 6/2014 | Hook .................. G06F 21/6218 713/171 |
| 2014/0195651 A1 | 7/2014 | Stockhammer et al. |
| 2014/0198252 A1 | 7/2014 | Pornprasitsakul et al. |
| 2014/0270680 A1 | 9/2014 | Bloch et al. |
| 2014/0334381 A1 | 11/2014 | Subramaniam et al. |
| 2015/0220516 A1 | 8/2015 | French |
| 2015/0304315 A1 | 10/2015 | Estehghari et al. |
| 2015/0326547 A1 | 11/2015 | Carlson |
| 2017/0318319 A1 | 11/2017 | McCue et al. |

FOREIGN PATENT DOCUMENTS

| | | |
|---|---|---|
| JP | 2003-009102 A | 1/2003 |
| JP | 2003-309795 A | 10/2003 |
| JP | 2005-506743 A | 3/2005 |
| JP | 2005-354497 A | 12/2005 |
| JP | 2006-517368 A | 7/2006 |
| JP | 2007-041756 A | 2/2007 |
| JP | 2012-248259 | 12/2012 |
| WO | 2002/073462 A1 | 9/2002 |
| WO | 2015/039888 A1 | 3/2015 |
| WO | 2015/113960 A1 | 8/2015 |
| WO | 2017/083985 A1 | 5/2017 |

OTHER PUBLICATIONS

International application No. PCT/CA2016/051350 International Preliminary Report on Patentability Chapter I dated May 22, 2018.
International application No. PCT/CA2016/051350 International Search Report dated Jan. 23, 2017.
International application No. PCT/CA2016/051350 Search Strategy dated Jan. 23, 2017.
International application No. PCT/CA2016/051350 Written Opinion of the International Searching Authority dated Jan. 23, 2017.
European application No. 16865359.0 office action dated Feb. 25, 2020.
European application No. 16865359.0 European search report and search opinion dated May 24, 2019.
Japanese Patent Application No. 2018-526721 Office Action dated Nov. 4, 2020 and its English translation included.
International application No. PCT/CA2016/051358 International Preliminary Report on Patentability Chapter I dated May 22, 2018.
International application No. PCT/CA2016/051358 International Search Report dated Mar. 28, 2017.
International application No. PCT/CA2016/051358 Search Strategy dated Mar. 28, 2017.
International application No. PCT/CA2016/051358 Written Opinion of the International Searching Authority dated Mar. 28, 2017.
Indian application No. 201817022859 Office Action dated Feb. 1, 2021.
U.S. Appl. No. 15/776,436 Office Action dated Mar. 5, 2020.
"Chapter 1: Overview of Cryptography ED—Menezes A J; Van Oorschot PC; Vanstone S A", Handbook of Applied Cryptography; [CRC Press Series on Discrete Mathematices and Its Applications], CRC Press, Boca Raton, FL, US, pp. 1-48, Oct. 1, 1996 (Oct. 1, 1996), XP001525001, ISBN: 978-0-8493-8523-0. Retrieved from the Internet:URL:http://www.cacr.math.uwaterloo.ca/hac/.
Feng-Cheng Chang et al: "Layered Access Control Schemes on Watermarked Scalable Media", The Journal of VLSI Signal Processing, Kluwer Academic Publishers, BO, vol. 49, No. 3, Jun. 28, 2007 (Jun. 28, 2007). pp. 443-455, XP019557804, ISSN: 1573-109X, DOI: 10.1007/S11265-007-0095-0.
Honggeun Kim et al: "An efficient implementation of RC4 cipher for encrypting multimedia files on mobile devices", Applied Computing 2007. The 22nd Annual ACM Symposium on Applied Computing—Mar. 11-15, 2007—Seol, South Korea, ACM—New York, NY, US. Mar. 11, 2007 (Mar. 11, 2007), pp. 1171-1175, XP058223667, DOI: 10.1145/1244002.1244256. ISBN: 978-1-59593-480-2.
Chen et al., An Encryption and Probability based Access Control Model for Named Data Networking, Dec. 2014, IEEE 33rd International Performance Computing and Communications Conference, pp. 1-8 (Year: 2014).
European application No. 16865364.0 European search report and search opinion dated Mar. 28, 2019.
Japanese Patent Application No. 2018-526628 Office Action dated Oct. 26, 2020 and its English translation included.

(56) References Cited

OTHER PUBLICATIONS

Gilles Privat et al: "A Flex-1 compliant object compositing representation", 35. MPEG Meeting; Aug. 7, 1996-Dec. 7, 1996; Tampere; (Motion Picture Expert Group or ISO/IEC JTC1/SC29/WVG11), No. M1026, July 1, 199.
Corresponding Canadian patent application No. 3,005,476 Office Action dated Jan. 21, 2023.
Corresponding European application No. 21173723.4 extended European examination report and search opinion dated Sep. 15, 2021.
Corresponding European application No. 16865364.0 European examination report and search opinion dated Jun. 16, 2021.
Giuseppe Ateniese et al. Key-Private Proxy Re-encryption. CT-RSA 2009, KBCS 5473, pp. 279-294, 2009. Springer-Verlag Berlin Heidelberg 2009.
Gutub et al., Hybrid Crypto Hardware Utilizing Symmetric-Key and Public-Key Cryptosystems. Nov. 2012. International Conference on Advanced Computer Science Applications and Technologies. pp. 116-121 (Year: 2012).
Corresponding European application No. 16865364.0 European examination report and search opinion dated Jun. 5, 2024.
Corresponding U.S. Appl. No. 18/504,502 Office Action dated Jun. 21, 2024.
Lin et al., "A Secure Fine-Grained Access Control mechanism for Networked Storage Systems", Jun. 2012, IEEE Sixth International Conference on Software Security and Reliability, pp. 225-234.

\* cited by examiner

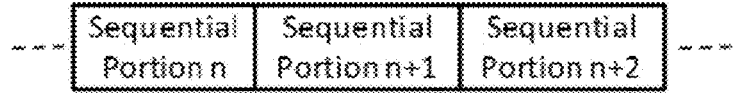
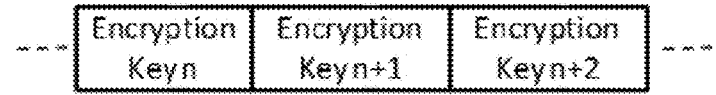
Figure 4

| Video Camera Feed 1 | Pub_Key_135; Pub_Key_057; Pub_Key_169 |
| Microphone Feed 1 | Pub_Key_135; Pub_Key_057; Pub_Key_169 |
| Video Camera Feed 2 | Pub_Key_135 |
| Microphone Feed 2 | Pub_Key_135 |

Figure 5

SECURE LAYERED ENCRYPTION OF DATA STREAMS

This application is a continuation patent application of U.S. patent application Ser. No. 18/306,294 with a filing date of Apr. 25, 2023, which is a continuation patent application of U.S. patent application Ser. No. 17/212,312 with a filing date of Mar. 25, 2021, which is a continuation patent application of U.S. patent application Ser. No. 15/776,448 with a filing date of Nov. 18, 2016, which claims the priority of U.S. provisional patent application No. 62/258,022, filed on Nov. 20, 2015.

TECHNICAL FIELD

The present application relates to distributing streams of data (e.g. video and other streams in a security network) through a network infrastructure. The present application further relates to secure storage and distribution of data streams. This application further relates to controlling access to data streams and to providing differentiated access to multiple data streams to multiple users.

BACKGROUND

Secure data stream distribution has a number of inherent challenges. Systems that accumulate large amounts of streaming data, such as video surveillance feeds and social media feeds, have to deal with enormous volumes of data which must be stored and retrievable for streaming on demand. When the streaming data is sensitive data, as is typically the case in a video surveillance system, there is the added challenge that these large volumes of data must be stored very securely and illegitimate access must be prevented. In general, a data stream may be a large, even endless, set of data. Data streams are generally divided into pieces, which together make up the stream. For example, a video stream may be made up of video frames. These pieces are usually finite in length although depending on the type of data stream, it can be made up of predetermined size pieces or arbitrary (finite) sized pieces.

The challenges inherent in data stream distribution are further exacerbated by growing sensitivity about how personally identifiable information data (PII), embedded within streams of data, is accessed, shared, employed and retained by investigators. An investigator is a user who harbors an interest in examining the contents of, or information about, any combination of data streams (e.g. a law enforcement agent, a prosecutor, a member of the security services or para-military organization, a security contractor, private investigator, a vendor contracted to enable forensic investigations or surveillance, a crime analyst, a marketing or business intelligence analyst, an automated system performing the functions of an investigator). According to the US Dept. of Commerce' NIST (Special Publication 800-122), PII is "any information about an individual [ . . . ] including (1) any information that can be used to distinguish or trace an individual's identity [ . . . ] and (2) any other information that is linked or linkable to an individual [ . . . ] Linked information is information about or related to an individual that is logically associated with other information about the individual. In contrast, linkable information is information about or related to an individual for which there is a possibility of logical association with other information about the individual."

The data governance challenges inherent in data stream distribution may be further exacerbated in situations in which PII is captured by an originator party and provided to one or more third party aggregator for the aggregation, synthesis and sense-making of information contained in, or about, the data streams. By way of example, an Originator may be a social media service provider or a retail merchant, interested in ensuring that certain PII of their clients is accessed by Investigators only when there is a legitimate need to do so.

Practically speaking, this typically means that in order to have a data stream system, it is necessary to also have a data center(s) where the stream data can be securely stored and from where access to the stream data can be reliably controlled. In a video surveillance system, this means that video streams and other surveillance data is stored on site or at a secure location that is under control of the data's owner. This can be quite burdensome for purchasers of surveillance systems. Smaller purchasers, such as homeowners or small business owners may want to have a security camera network, but may not necessarily want the burden of having to set up, own and maintain a data center just for surveillance. Moreover, if the data is to be secure, it is desirable to have redundant copies of it, which can be difficult for single-location customers. Owners of large security systems networks, such as large businesses with a large number of cameras and other data sources, e.g. spread out over large or widespread premises may have the technical staff to run a data center, however with larger networks of surveillance equipment (or other data streaming sources) come very large quantities of data, which in turn require very large and expensive data centers.

The advent of cloud computing has brought about scalable solutions for data storage and access. Cloud computing services offer the ability to store small or large amounts of data and streaming access online. Moreover, cloud computing may provide redundant safety measures to ensure robust resilience to issues that can affect data storage such as floods, power failures, natural disasters, etc. . . . Cloud computing offers an attractive alternative to self-administered data centers. It allows a purchaser to obtain reliable, scalable, redundant storage that is typically 24/7 accessible.

However, cloud computing suffers from trust issues. In particular, cloud computing typically involves the purchase of on-demand services from a third party which may make certain security guarantees but which ultimately is beyond the control of the purchaser. With highly sensitive data such as video streams from security cameras and other security-related data which may be core to the integrity of an organization, there is a reluctance to resort to external services for storage. Vulnerability to hackers and to extra-judicial access, among other concerns, have discouraged the adoption of cloud computing for streaming data storage in certain industries.

Access control is another challenge facing streaming data management and particularly video surveillance data management. For example, in a video surveillance system, security staff may have access to the video feed from certain cameras, while it may be desired to keep the feed of other cameras, e.g. in highly sensitive areas, inaccessible to all but a subset of users.

Likewise, there may be areas that may not be monitored, e.g. for legal reasons, but where monitoring data could be used under certain conditions, e.g. with a warrant. In some jurisdictions, for example, it may be illegal to film public places or the private premises of others. However, it would be desirable in the event of a break-in where a burglar may have come from the public place or private premises, to be able to provide investigators footage of those locations if they could legally review it.

Many centralized streaming services, e.g. online video content streaming services, operate on the principle that the central servers are trusted and that the end user stations are not.

Securing means and architectures currently known in the art are typically session-based. An example of such a system is illustrated in FIG. 1. Significant responsibility for such securing within storage services is placed on the account validation and file server components, burdening the latter with computational overhead that still renders the file storage service vulnerable overall. Additionally, archive servers are typically made to manage keys, credentials, or other securing schemes, and often confer all but the crudest of access rights (i.e. fully granted or fully denied) to archived content. Deeper intelligence as to the content shared is likewise typically lacking preventing more sophisticated—and nuanced—forms of sharing, restriction, and rights management.

SUMMARY

In accordance with a first aspect is provided a method for controlling access to streaming data by users over an untrusted network. The method comprises at a trusted network zone at an encryption computer system obtaining from a key generator a first symmetric encryption key stream comprising a first plurality of distinct symmetric encryption keys encrypting respective sequential portions of a first data stream to create a first symmetrically encrypted data stream comprising sequential portions of encrypted data. The method further comprises at the trusted network zone receiving at least one public asymmetric encryption keys from respective remote computer systems over an untrusted network. The method further comprises at the trusted network zone. The method further comprises at the trusted network zone generating asymmetrically encrypted key stream data by digitally encrypting by the encryption computer system the first symmetric encryption key stream using each one of the at least one public asymmetric encryption keys to create respective asymmetrically encrypted first key streams wherein each of the asymmetrically encrypted first key streams is encrypted with a respective one of the at least one public asymmetric encryption keys, the asymmetrically encrypted key stream data comprising each of the asymmetrically encrypted first key streams. The method further comprises at the trusted network zone from the encryption computer system, transmitting the asymmetrically encrypted key stream data over the untrusted network.

In accordance with another broad aspect is provided an encryption computer system for operating in a trusted network zone to control access to streaming data by users over an untrusted network. The encryption computer system comprises computer-readable instructions stored in a computer-readable storage medium comprising instructions for instructing a general-purpose processing unit to obtain from a key generator a first symmetric encryption key stream comprising a first plurality of distinct symmetric encryption keys encrypting respective sequential portions of a first data stream to create a first encrypted data stream comprising sequential portions of encrypted data. The encryption computer system also comprises computer-readable instructions stored in a computer-readable storage medium comprising instructions for instructing a general-purpose processing unit to receive at least one public asymmetric encryption keys from respective remote computer systems over an untrusted network. The encryption computer system also comprises computer-readable instructions stored in a computer-readable storage medium comprising instructions for instructing a general-purpose processing unit to generate asymmetrically encrypted key stream data by digitally encrypting the first symmetric encryption key stream using each one of the at least one public asymmetric encryption keys to create respective asymmetrically encrypted first key streams wherein each of the asymmetrically encrypted first key streams is encrypted with a respective one of the at least one public asymmetric encryption keys, the asymmetrically encrypted key stream data comprising each of the asymmetrically encrypted first key streams. The encryption computer system also comprises computer-readable instructions stored in a computer-readable storage medium comprising instructions for instructing a general-purpose processing unit to transmit the asymmetrically encrypted key stream data over the untrusted network.

In accordance with another broad aspect is provided a method for accessing streaming data over an untrusted network. The method comprises receiving at an agent station a symmetrically encrypted data stream comprising sequential portions of encrypted data. The method further comprises receiving at the agent station a asymmetrically encrypted key stream encrypted with a public key, the asymmetrically encrypted key stream comprising an encrypted symmetric encryption key stream comprising a plurality of distinct symmetric encryption keys encrypting respective sequential portions of a data stream into the symmetrically encrypted data stream. The method further comprises at the agent station, decrypting the asymmetrically encrypted key stream with a private key to derive the symmetric encryption key stream comprising the plurality of distinct symmetric encryption keys. The method further comprises at the agent station, decrypting the symmetrically encrypted data stream using symmetric encryption key stream by decrypting each sequential portion of encrypted data with a respective one of the plurality of distinct symmetric encryption keys to derive at least a portion of the data stream. The method further comprises at the agent station processing the at least a portion of the data stream.

In accordance with another broad aspect is provided a computer system for accessing streaming data over an untrusted network comprising computer-readable instructions stored in a computer-readable storage medium comprising instructions for instructing a general-purpose processing unit to receive at an agent station a symmetrically encrypted data stream comprising sequential portions of encrypted data. The computer system further comprises computer-readable instructions stored in a computer-readable storage medium comprising instructions for instructing a general-purpose processing unit to receive at the agent station a asymmetrically encrypted key stream encrypted with a public key, the asymmetrically encrypted key stream comprising an encrypted symmetric encryption key stream comprising a plurality of distinct symmetric encryption keys encrypting respective sequential portions of a data stream into the symmetrically encrypted data stream. The computer system further comprises computer-readable instructions stored in a computer-readable storage medium comprising instructions for instructing a general-purpose processing unit to decrypt the asymmetrically encrypted key stream with a private key to derive the symmetric encryption key stream comprising the plurality of distinct symmetric encryption keys. The computer system further comprises computer-readable instructions stored in a computer-readable storage medium comprising instructions for instructing a general-purpose processing unit to decrypt the symmetrically encrypted data stream using symmetric encryption key stream by decrypting each sequential portion of encrypted data with a respective one of the plurality of distinct symmetric encryption keys to derive at least a portion of the data stream. The computer system further comprises computer-readable instructions stored in a computer-readable storage medium comprising instructions for instructing a general-purpose processing unit to process the at least a portion of the data stream.

BRIEF DESCRIPTION OF THE DRAWINGS

The invention will be better understood by way of the following detailed description of embodiments of the invention with reference to the appended drawings, in which:

FIG. 2b shows a conceptual illustration of surveillance zones of the area of FIG. 2a;

FIG. 4 shows a block diagram of data used in the context of the system of FIG. 3 in accordance with a non-limiting example;

FIG. 5 is a conceptual illustration of a permissions table in accordance with a non-limiting example;

DETAILED DESCRIPTION

Figure 1:
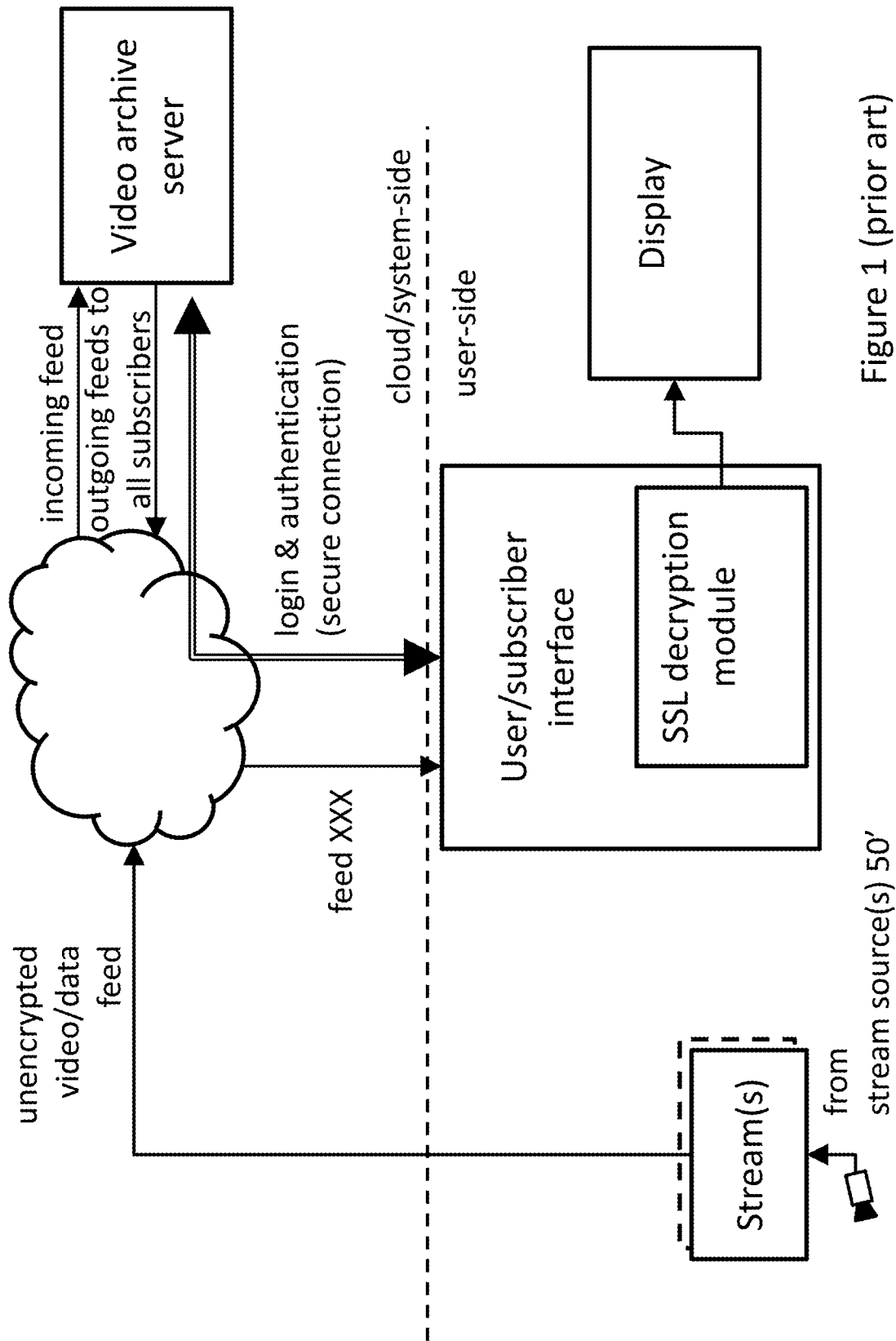
FIG. 1 shows a block diagram of a prior art session based communication system.
Figure 2B:
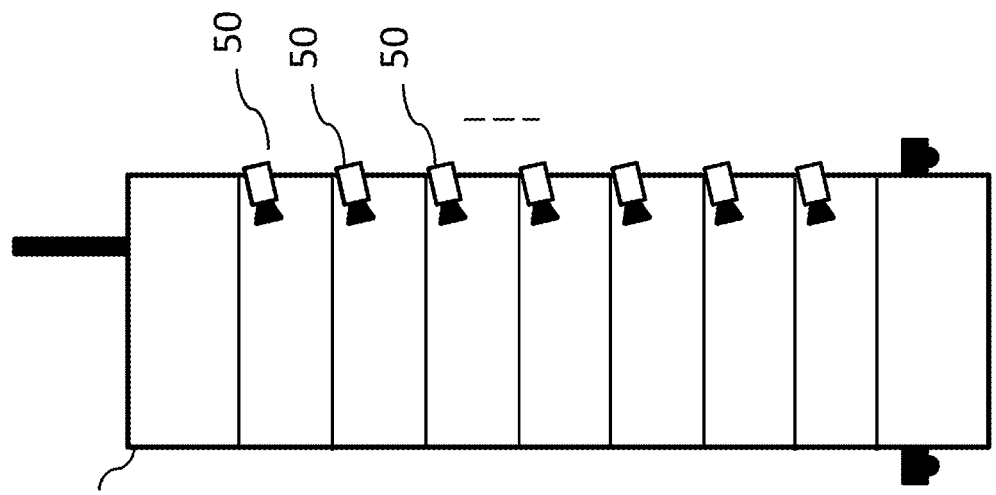
Figure 2A:
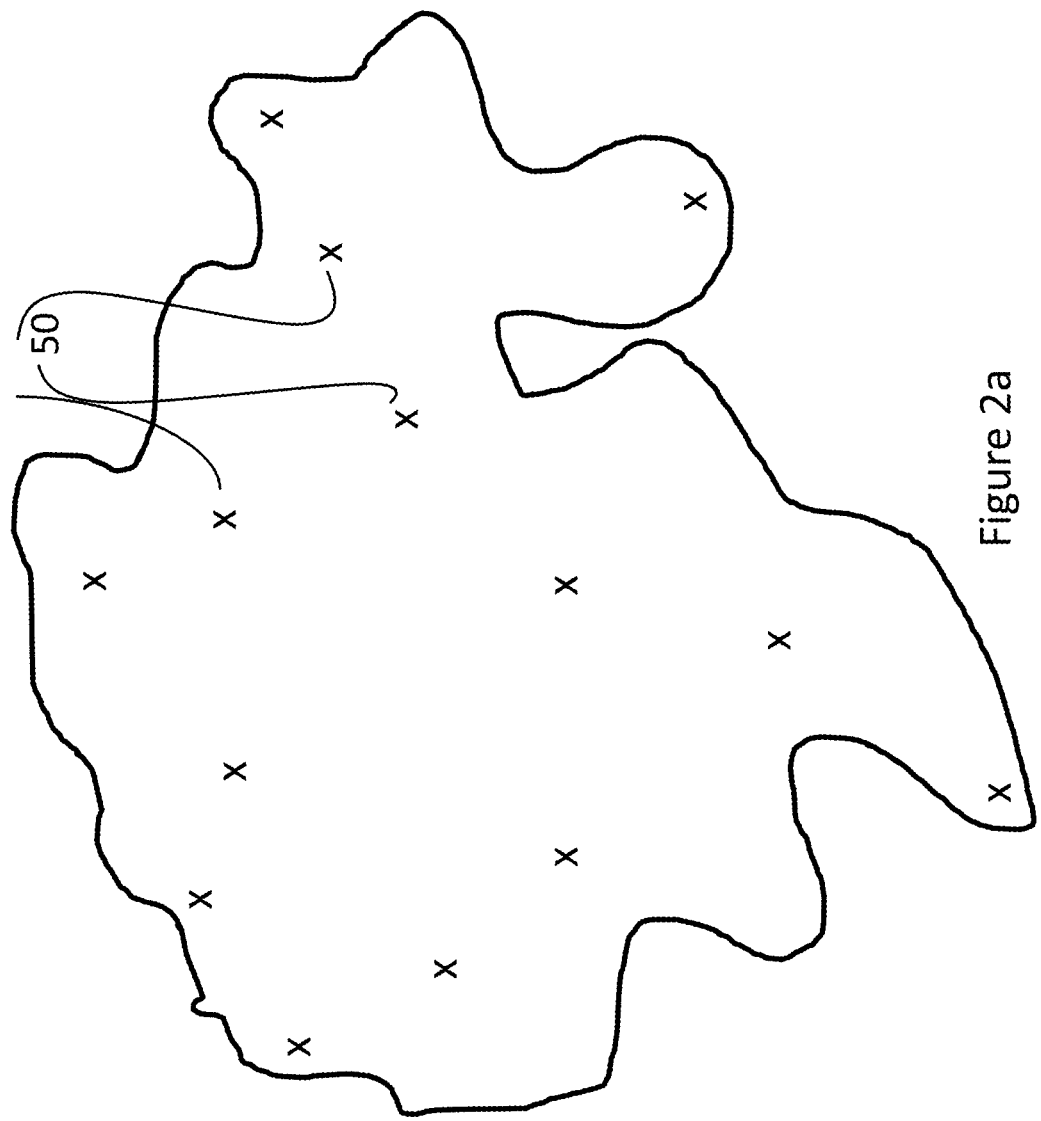
FIG. 2a shows a conceptual illustration of a security surveillance area monitored by cameras in accordance with a non-limiting example.

FIG. 2a and FIG. 2b, illustrates conceptually a premise 25 where a video surveillance network operates. The video surveillance network comprises a plurality of data stream sources 50, which in this example are video surveillance cameras installed at various locations in the premises 25. Such monitoring may be desired for any purpose, such as for reasons related to surveillance and/or in connection with securing a given area, for archiving the events occurring within a given delimited space, or for any other purpose. The monitoring typically originates with a stream source 50, such as a security camera or other device capable of generating a streaming signal. Each source 50 may capture one or more stream. Besides video data, data sources 50 may provide other types of data such as audio data. The streaming data is organized into a data stream according to a suitable format. The Motion Picture Expert Group (MPEG) specifies several formats of video/audio streams, many of which are commonly used in video surveillance. Raw image data or sampled sound data may also be streamed in a bitstream, although this requires more bandwidth.

Other types of data sources may also provide different types of data. For example, a video stream may have an accompanying overlay stream providing added information to visually overlay on the video at output. The overlays may be associated with a different permission level than the underlying video (e.g. if they contain sensitive information). Other types of streams may include location streams such as a stream of GPS coordinates (e.g. corresponding to the location of a moving vehicle or camera), video masking overlays, subtitles or other textual captions (e.g. from speech-to-text), motion levels captured by a motion sensor, audio levels captured by a microphone, event streams (e.g. a stream of access control events such as door openings and motion detections, or video analytics events), license plates read by a license plate reader (e.g. from a traffic camera), etc., For any of these types of data, a stream may be built by designing a structure to store the data which serves as a frame that is associated with a certain position in time or in a sequence. Frames may then be accessed in sequence, e.g. transmitted over the network sequentially over time, as a stream.

The streams may also be stored as a file comprising the sequence of frames and read in a continuum, e.g. according to a current playback time Tx. In one embodiment, each frame of each stream may be associated with a particular timestamp which may be used to synchronize the different streams. E.g. one or more streams being read from memory may be accessed according to a playback time, which may be used amongst the different streams to seek chronologically synchronized portions of the streams. Likewise streams being streamed over the network and received at a network interface may be buffered and played out according to the common playback time Tx. Unavailability of frames one of the streams being played back may cause a buffering which may affect all streams, or that stream alone may be buffered, seeked forward to catch up to the others when buffered. In the case of stored streams where the storage is accessible, one can seek forward or backwards in the streams to alter the playback time Tx. Other mechanisms for synchronizing multiple streams may be used.

A data stream may be finite, referring to such contents as the entirety of a computer file; alternatively, it may be infinite or have an unspecified duration such as video captured from a live surveillance camera. Typically, such a stream may be stored as multiple files in archiving, for example in files corresponding to a fixed amount of time (e.g. 30 minutes) or data (a number of packets, or a number of bytes, etc. . . . ). Generally in the present example, data source comes from capture devices and data consumption occurs at remote workstations. However, in alternate embodiments, data streams may be provided by one or more users or subscribers at workstations. In such a case, the users or subscribers, and their workstation may take the role of data source(s). These workstations may be originators of the data streams or may have received them from a real source that produced them and provided them to the workstations by way of any interface means appropriate for doing so, such as through a physically trusted channel within secured premises, via a secured encrypted web upload portal, or by way of an encrypted tertiary file transfer application.

One or more streams may be uploaded or transferred to embodiments by any appropriate means, as through a network. Said streams or portions thereof, may be intended for a single recipient or user/subscriber, or for a specific user/subscriber set. In another embodiment, a permissions management mechanism may be implemented within the user/subscriber interface to govern such details as which users(s) may access the (1) stream(s), (2) any portions thereof, or (3) information about the streams(s); and any further conditions or limitations governing such access (such as a time restriction). In an embodiment, the user access/permissions list for each stream or any portion thereof, may be specified for each respective stream and any combination of streams therein, within the user-subscriber interface. In other embodiments, the users/subscribers may transfer streams to a central system or to any other user granted authority, typically by the first uploader or other party possessing ownership authority over a specific stream. Likewise, such access/permission may be modified, and correspondingly impact feed encryption policy and later accessibility of respective streams, further discussed herein.

In-transit security of data streams is important to avoid compromising the integrity and access of the streams in the course of the stream upload or transfer process, to be further described herein. Data sources 50 have a role as one basis for production of video/data streams as discussed for various embodiments. Production of video/data streams may refer to the data streams emanating from any stream source 50; production may likewise encompass the result of a stream following any particular video or other editing process, post-process, enhancement, or other manipulation.

Figure 3:
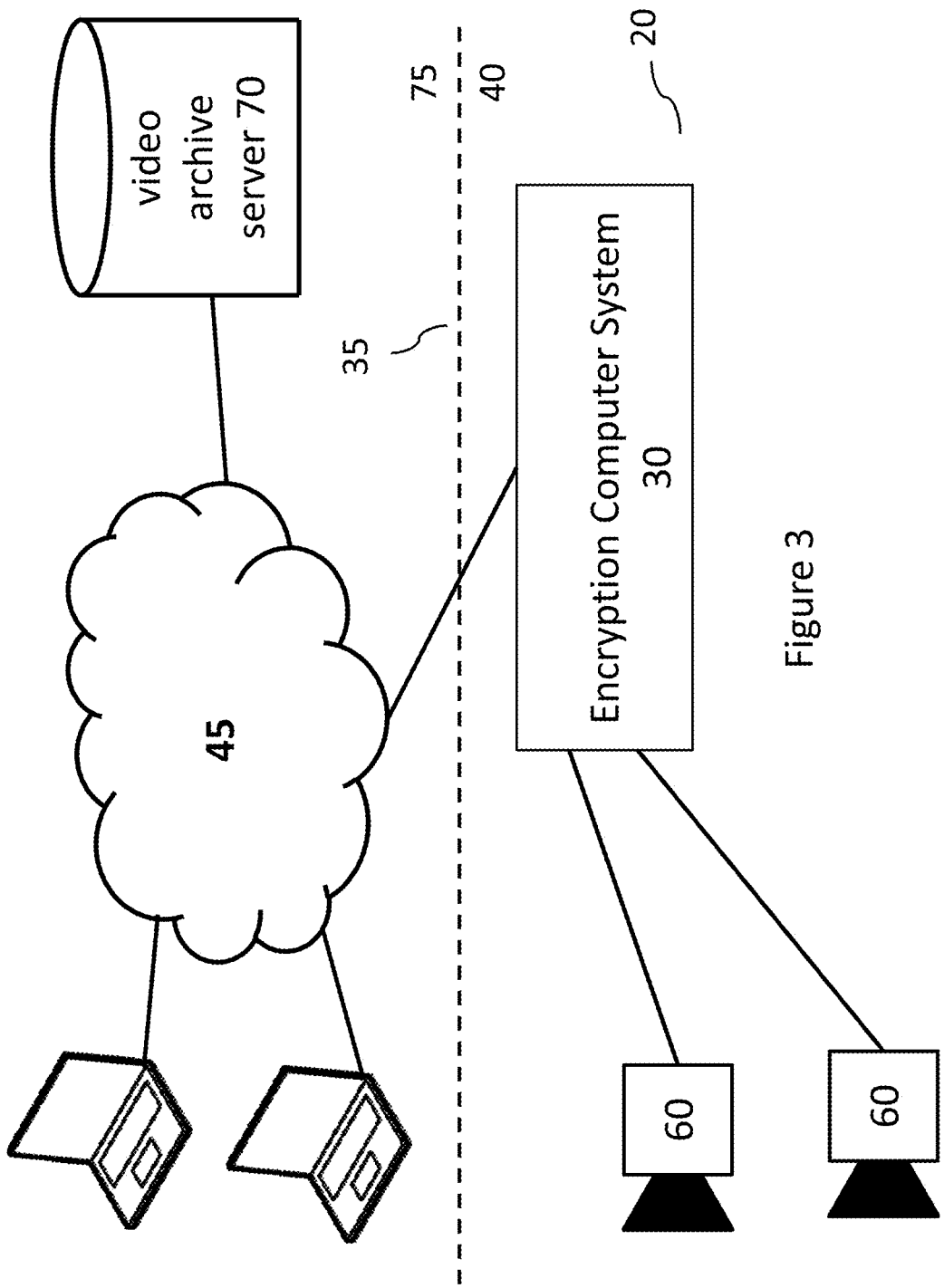
FIG. 3 shows a block diagram illustrating a video surveillance system in accordance with a non-limiting example.

FIG. 3 is a block diagram illustrating a video surveillance system 10 in accordance with a particular example. A trusted network zone 20 comprises encryption computer system 30. The encryption computer system 30 may be or be comprised in, for example, a server such as a video surveillance server. In this particular example, the trusted network zone 20 comprises interconnected network elements such as routers and computing devices communicating over trusted connections or access to which is controlled to prevent unauthorized access. Network elements in a trusted network zone may be trusted elements, data originating from which is trusted as genuine and non-malicious. the trusted network zones In particular, the trusted network zone 20 in this example is a portion of a local area network located at a client premise 40 that is protected by a DMZ 35 separating the trusted network zone from an untrusted network or network area 75, in this example the internet at large 45. Generally speaking a trusted network zone will comprise devices that are trusted as not being the source of malicious activity such as data hacking, and connections between them that are trusted as being secure. A trusted device may be trusted by virtue of being in a controlled location and/or by virtue of control over the software running thereon (e.g. in the case of computers) and/or by virtue of having a known origin or configuration (e.g. in the case of IP cameras). A trusted connection may be trusted by virtue of being physically embodied in an area of control (e.g. at client premise 40) and/or by virtue of being made secure by encryption, tunneling (e.g. VPN) or the like.

In this particular case, streaming data sources, which here are cameras 60 are also located in the trusted network zone 20 and are connected to the encryption computer system 30 to communicate therewith. Although a direct connection is shown between the encryption computer system 30 and the cameras 60, this connection may in fact be a network (e.g. LAN or WAN) connection going through a packet-switched network.

In this particular example, the encryption computer system 30 comprises a computer station operating as a security server and running security service software which manages data streams from the various data sources 50 as well as user permissions to access the streaming data from the various data sources 50.

The stream data that comes from the various data sources 50 is encrypted using a key encryption system. More particularly, the stream data is encrypted using a key stream comprising a plurality of distinct encryption keys that are provided sequentially over a period of time. In this example, the stream data is encrypted symmetrically using a symmetric encryption key stream that is a stream of symmetrical encryption keys. The key stream may be a non-repeating key stream, for example, of randomly generated new keys. The data stream can be divided into data stream portions, which may be of preset or arbitrary but finite length (e.g. a number of video frames for a video stream). Each portion may be encrypted by a respective random symmetric key. The sequence of symmetric keys encrypting a data stream may make up a key stream.

The so encrypted stream data may be stored at the encryption computer system 30, but in this particular example, the stream data, after being encrypted, is sent over the internet 45 to be stored on a video archive server 70. The video archive server may be any suitable data server/storage, and may be trusted or untrusted. Though the video archive server 70 is shown here as a single discrete device, this is merely for simplicity of illustration as the video archive server of this example is in fact implemented using purchased cloud server services which may distribute the stored data over a network of servers at unknown locations with redundant copies distributed likewise. The video archive server 70 of this example is considered untrusted since it is not within control. It is in fact located outside of the client's premises, running software of unknown origins, has data security and integrity measures not within the client's control, and communicates over connections outside the client's control.

As described in more details herein, in order to control access to the stream data, e.g. to provide for secure communication and/or storage of the stream data and to restrict access only to authorized agents, the key stream itself is encrypted. More particularly, access to the stream data is limited to entities associated with a particular public key in an asymmetric encryption public-private key pair. The entity in question may be an agent of any kind such as a user or a particular workstation. In the present example, there are a plurality of agent workstations 65 which may access stream data from the data sources 50, although they may each have different access rights giving them access to different portions of the stream data. Each agent workstation 65 has a respective public key pair for enabling third parties to encrypt data in a way decryptable using a private key at the agent workstation 65.

In this example, each public key is associated with an entity (in this example an agent workstation, but the public key may be more specifically associated with a particular user using suitable user-access control over the private key) which has certain data-access permissions. Each entity that is entitled to access a particular stream data, e.g. stream data providing from a particular data source 50, may provide to the encryption computer system 30 their public key and the encryption computer system 30 may then encrypt the key stream with which that particular stream data is encrypted with the public key, to create an asymmetrically encrypted key stream. This asymmetrically encrypted data stream may also be stored on the video archive server 70 or elsewhere such as in the encryption computer system 30.

FIG. 4 is a block diagram illustrating the organization of data 100 in the present example. In this example, there is data 100 that generally pertain to stream data from data sources 50 and data pertaining to encryption keys with which the stream data is encrypted.

The data stream 105 may comprise stream data from a particular source 50. In this particular example, the data stream 105 comprises video data from a particular surveillance camera. The data stream 105 may be encrypted at the encryption computer system 30 using a key stream. In this example there are multiple data streams that are so encrypted, therefore the data stream 105 is a first data stream to be encrypted. In alternate examples, it is possible for the data stream to comprise data from multiple data sources 50 if combined in stream form. Likewise, a single data source 50 may provide multiple streams of data, e.g. multiple encodings of a video (MPEG-4, HEVC, etc. . . . ) or output streams from multiple sensors.

The data stream 105 is encrypted using a corresponding first key stream, in particular a first symmetrical encryption key stream 110 comprising distinct symmetric encryption keys. The distinct symmetric encryption keys correspond to respective portions of the data stream 105, typically contiguous portions, particularly time-contiguous (e.g. video feed from a particular contiguous portion of time) or data-contiguous (e.g. a set of successive bytes of a data stream). In this example the data stream 105 comprises stream data that can be defined in a plurality of sequential portions, each of which is encrypted with a different one of the distinct encryption keys of the first symmetric encryption key stream. In general sequential portions may be sequenced in accordance with capture time but may also be sequenced otherwise, for example in accordance with transmission time, if in a different order than capture time, or sequenced according to other logical organization of the data, e.g. sequenced according to application layer packets or sequenced according to other layer packets.

The first data stream 105, encrypted using the first symmetric encryption key stream 110 by digitally encrypting with each of the distinct symmetric encryption keys of the first symmetric encryption key stream 110 respective sequential portions of the first data stream 105 to create a first symmetrically encrypted data stream 115. The first symmetrically encrypted data stream 115 is thus symmetrically encrypted using the sequence of symmetrical encryption keys in the first symmetrical encryption key stream 110. The first symmetrically encrypted data stream 115 comprises sequential portions of encrypted data. These portions, not necessarily organized in sequence although they are in this example, comprise encrypted versions of the sequential portions of the first data stream 105, each having been encrypted with a different encryption key from the first symmetric encryption key stream 110.

In one particular example, the first symmetrically encrypted data stream 115 is a video stream comprising H.264-encoded video that is transported using the Real-time Transport Protocol (RTP). The RTP stream is divided into RTP packets which comprise an unencrypted header and a payload. The payload comprises the data to be streamed, in this case video data, and more particularly H.264 video frames. In this particular example, the payload comprises one or more, typically a number of H.264 video frames beginning with an I frame to allow decoding independence from data in a previous RTP packet. Conveniently, access to a stream granted to a user may be limited to one or more RTP packet, which can be decoded independently. The entire H.264 frames are encrypted, making the content of the RTP payload unusable by an entity without the decryption key.

The header of the RTP packets comprise several fields including in this example a time stamp, indicative of a time to which belongs the content stream, a payload type, which in this case would indicate that the payload is H.264 video and a key index (MKI) which is used to synchronize the data stream with the key stream. Other data that may be stored in the header include a stream identifier which identifies according to a convention what the stream represents (e.g. "camera 1 video stream", or "first floor hallway").

In this example, audio data is encrypted separately from video data and transmitted in a separate RTP stream. This facilitates setting different permission levels for audio and video. For example in some cases video data from a conference room may be viewable by a security guard in a control center but the security guard may not have permission to hear the audio data conveying the discussions going on in the conference room. Alternatively however, an RTP stream could combine multiple streams or multiple portions of a combined (e.g. audio+video) stream in its payload.

Other data streams like the first symmetrically encrypted data stream 115 may exist together in the manner described above, or may be transmitted according to other protocols.

In this example, Real Time Streaming Protocol (RTSP) is used to manage RTP streams.

As mentioned, in this particular example, an H.264 (or other type of stream) is encrypted and transmitted in payload portions of RTP packets. Also as mentioned the encryption is done according to changing symmetric keys. In this particular example, the payload of each RTP packet comprises data encrypted with a single key. Multiple RTP packets may share a particular key (optionally, there may be a 1:1 relationship between RTP packets and keys) but in this example, the content of an RTP packet does not switch from being encrypted with one key to being encrypted with another key in the middle of the payload. Thus the MKI (key index) field of the RTP packet header, only indicates a single key from the key stream. As such, in this example, since access to a portion of a stream is provided at least in part by granting access to the decryption key, access is granted to portions of the stream encrypted by one or more key, and these portions represent, in this example, a finite number of whole RTP packets. Choosing how frequently (e.g. based on time or data quantities such as numbers of packets or frames) to change the encryption keys (e.g. every thirty seconds, or every 900 frames), impacts the quantity of data stream accessible by a particular key and also creates, in this example, a minimum quantity of data stream that can be contained within an RTP packet.

In order to support independence of key change frequency and RTP packet organization, the RTP packet may be provided with additional information as to other keys (e.g. other key indices) and an indication of where in the payload data is the transition point(s) from one key to the next.

Now the video surveillance system has multiple data sources 50 and the encryption computer system 30 deals with multiple data streams. Data streams may be organized by permission levels. In one particular embodiment, data streams are classified according to permission groups, with all the data streams in one particular permission group being each encrypted using a same encryption key stream. This does not mean that they are necessarily encrypted together, rather, they may be individually encrypted (allowing individual storage and access to the different encrypted data streams in the permission group) but with the same encryption keys. In the present example, however, every data stream is encrypted with different respective encryption key streams.

The encryption computer system 30, has access to an electronic access permission directory that stores associations between entities and access to data streams. In the present example, the electronic access permission directory is a permissions 80 table stored in a computer-readable storage of the encryption computer system 30, as shown in FIG. 5. The table links comprises an entry for each data stream in the system 10 and for each data stream a list of entity values that are indicative of entities that have the right to access each data stream. In this particular example, there is only one type of access possible: read access. However, in alternate example the directory may comprise an indication of the type of access allowable for each entity for each data stream. For example the table could contain for each data stream entry a list of entity values for each of read access, overwrite access and delete access.

In the present example, the entities are represented in the directory by their public key. Thus the entity value representative of the entity is the public key with which a symmetric encryption key stream is encrypted to provide access to a corresponding data stream to the entity. In alternate embodiments, other identifiers such as user IDs or IP addresses of agent workstations 65 may be used. In such a case the directory may also comprise an entry to store the public key for each identifier to allow the encryption computer system 30 to find and obtain the public keys used in encrypting the symmetric encryption key streams.

In the present example, the encryption computer system 30 only encrypts a key stream with a particular public key if the public key is associated with a permission to access all or a portion of the corresponding data stream. For example, as the encryption computer system 30 receives the first data stream 105, the encryption computer system 30 consults the permissions directory 80 to determine which public keys or entities are permitted to access the first data stream. In this example the first data stream 105 is the video camera feed 1. The encryption computer system 30 logic looks up the video camera feed 1 (the first data stream 105) using an identifier associated with the first data stream 105, in this example a MAC address that is provided with the first data stream 105 and that is stored in the directory 80 under Video Camera Feed 1, and identifies in the directory 80 that three public keys are associated with access to the first data stream 105, namely Pub_Key_135, Pub_Key_057, and Pub_Key_169. In response, the logic of the encryption computer system 30 encrypts the first symmetric encryption key stream 110 using each of these three public keys.

In alternate embodiments the permissions directory may be a more complex database comprising additional fields such as a time period for which permission is granted. The time period may correspond to capture time as indicated, e.g. by time stamps in packet headers of the data streams that are preserved as entries in the headers of the encrypted data streams. Thus a particular entity or agent may be granted access to camera feeds from a private office after work hours, but not during work hours. Other indications of restrictions on data access may be stored in the directory and retrieved by the encryption computer system 30 to control access to the streaming data such as variables indicating conditions based on other events obtained from other data sources 50. For example where a data source 50 is an electronic card reader used by employees to enter or exit a work premises, access to a camera feed of an office by a particular entity may be limited to times between when the electronic card reader registers an exit by the office's occupant and when the electronic card reader registers an entrance. As such the encryption computer system 30 may comprise logic for reading data, e.g. streaming data, from data sources 50 and selectively encrypting a particular key stream associated with a particular data stream from a data source 50 on the basis of the read data. Alternatively or additionally, the encryption computer system may also selectively transmit the key stream on the basis of the read data.

Returning to the example at hand, the first symmetric encryption key stream 110, and all other symmetric encryption key streams, are encrypted asymmetrically with the asymmetric encryption keys associated with a permission to access the corresponding data stream. Thus is created an asymmetrically encrypted first key stream created with a first public key (in this example Pub_Key_135) 120. There is a corresponding asymmetrically encrypted first key stream for all the other public keys associated with access to the first data stream 105. For the other key streams (which in this example are associated with individual data streams but could alternatively be associated with an entire permission group), another set of asymmetrically encrypted key streams may be created, one for each public key associated with access to the corresponding data.

In accordance with this particular example, the first symmetric encryption key stream 110 is encrypted using a user's, or more generally an entity's, public key according to an asymmetric encryption algorithm. Now in this example, the asymmetrically encrypted first key stream using the particular public key 120 is made by creating packets (called here for convenience 'key packets') comprising a non-encrypted portion and an encrypted portion. The non-encrypted portion comprises a thumbprint identifying the entity associated with this encrypted key stream. The thumb print may, for example, comprise the public certificate/public key of the entity. This can be used when receiving a request for a data stream to identify the corresponding encrypted key stream corresponding to the requester and to send the same to the requester.

Now in this example, each key packet of the encrypted key stream comprises a single encrypted encryption key. This in this example there is a 1:1 relationship between symmetric keys from the first symmetric encryption key stream 110 and packets (key packets) of the asymmetrically encrypted first key stream using a particular public key 120. In alternate embodiments, the encrypted key stream could be organized differently. Here, however, the non-encrypted portion of the key packets in the encrypted key stream also comprises a life span field comprising life span data indicative of the span of use of an encryption key contained within the packet (in this case, the encryption key of the packet). As mentioned, symmetric encryption keys are changed at a certain frequency to encrypt the data stream with ever-changing symmetric keys (hence the key stream). The life span data provides an indication of the duration (e.g. in time or in number of frames, or otherwise) of the portion of the data stream that was encrypted with a corresponding (symmetric) encryption key.

The encrypted portion of the key packets comprise encryption keys, in this example a single one. However, other information may be encrypted along with the symmetric encryption keys of the key stream. In this particular example, the encrypted portion also comprises information on how to process the encrypted data stream. For example, it may comprise information indicative of the type of data encrypted and how to process it, or indicative of the encryption protocol used to encrypt the data stream. Here, the encrypted portion comprises protocol information indicating what kind of protocol is used to transmit the encrypted data stream and, optionally, protocol parameters. In this example the SRTP protocol is used.

In this particular example the key packets also comprise a key index (MKI) corresponding to a key index provided in the corresponding encrypted data stream. This may be in the unencrypted portion of the packet. The MKI is used by the receiving device to synchronize decryption keys with corresponding portions (in this case RTP packets) of the encrypted data stream to ensure each portion is decrypted using the right decryption key. Indeed, time stamps may also be provided with packets from both streams, which may also be used for synchronization. However, in certain instances if the wrong key is used to decrypt a portion of the data stream, the resulting gibberish may crash a decoder (e.g. an MPEG decoder) processing the data. Therefore in order to ensure proper synchronization the MKI index is cross-checked by the receiver to ensure that the proper key is used to decrypt any portion of the encrypted data stream. In particular, the receiver receives an encrypted data stream encrypted with a symmetric encryption based on a varying (e.g. time-varying) symmetric encryption key streams comprising individual portions of the encrypted data stream each being associated with a decryption key from a decryption key stream (in this case the decryption key is the same as the encryption key) and comprising a key index associated with a corresponding decryption key in the decryption key stream. The receiving device receives an encrypted key stream comprising the decryption key stream comprising portions associated with respective decryption keys. The decryption keys are associated with respective key indexes, in this example by having the key index provided with the decryption keys in the stream. The receiving device isolates the key index for respective portions of the encrypted data stream, identifies the decryption key associated with it, in this case by isolating the key index from the key stream and obtaining the associated key and decrypting the associated key using a private asymmetric decryption key, and finally, the device uses the decrypted symmetric decryption key associated with the key index to decrypt the portion or portions of the encrypted data stream associated with the same key index.

The encryption of key streams has been described with reference to one particular key stream (the first symmetric encryption key stream 110) and for one particular asymmetric encryption key. It should be understood, however, that the foregoing can be applied to encrypt the key stream for other asymmetric encryption keys to provide other entities with access to the corresponding data stream. Likewise, the above can be applied to other symmetric key streams corresponding to other data streams.

The symmetric key streams may be discarded after encrypting with one or more asymmetric public keys such that only entities having access rights can then decrypt the stream and reencrypt it using another public key to provide another entity access to the data stream. This may be combined with a request to a remote server (e.g. the server which controls streaming of encrypted data streams and/or encrypted key streams to entities) to provide the rights to the other entity such that the entity may receive the corresponding data stream and/or key stream upon request.

In this particular example, data streams are immediately encrypted upon receipt by the encryption computer system 30 (alternatively they may be encrypted upon creation at the data source 50) and no copy is kept of the unencrypted data. Key streams are kept in a secure location and are isolated from the outside never to be sent, in this example, unless encrypted. As such, the absence of a version of the first symmetric encryption key stream 110 encrypted by another entity's public key makes it impossible for that other entity to obtain the key stream and to decrypt the first symmetrically encrypted data stream 115. As such even if such a third party (without permission) were to obtain the first symmetrically encrypted data stream 115 (which is the only stored version of the data stream 105), and even if such a third party were to obtain the asymmetrically encrypted first key stream encrypted with any of the legitimate public key, such a third party could do nothing with the data since it would be incapable of decrypting it to unlock the data within. It would be incapable of first decrypting the key stream, since it was never encrypted with that party's public key, and consequently, it could never obtain the key stream required to decrypt the data stream.

Thus, the system 10 benefits from inherent built-in safety that makes it possible to rely less on the security of the video archive server 70. By consequence it is possible to use otherwise insufficiently trusted systems for storage and distributed access to the stream data.

It will be noted that symmetrical encryption is generally considerably less computationally intensive than asymmetrical encryption. Encryption is often not used in streaming applications because of the burden it imposes on the system. Indeed asymmetric encryption increases significantly the size of and therefore bandwidth required for a stream while imposing a heavy computational burden on encryption/decryption operations. As such, for streaming applications which have high data volumes and require efficient decryption and decoding, such encryption schemes have proven too burdensome for widespread adoption. In contrast symmetrical encryption is a much "lighter" solution which is less computationally burdensome and increases the size/bandwidth by a smaller factor. However, symmetric key encoding alone is less secure due to need to the transfer of keys. Interception of the key would render a stream encrypted with a single symmetrical key entirely compromised. For this reason the present system 10, whereby data streams are encrypted with a sequence of symmetric key streams and whereby the key streams are encrypted asymmetrically for particular entities, is a particularly robust system that is nonetheless far less burdensome than pure asymmetrical encryption.

Advantageously, this encryption scheme, whereby a data stream is encrypted symmetrically with a key stream and the key stream is encrypted asymmetrically with public keys of intended data stream recipients, does not depend upon the establishment of a secure tunnel between endpoints to exchange symmetric keys safely. Note that if data streams were encrypted asymmetrically, there would need to be a different encrypted version of each data stream for each of the public encryption keys used. In contrast in the system 10, only a single copy of the stream data is required, which is symmetrically encrypted to be safely storable on an untrusted server and transmittable over an untrusted network.

Generally a key stream according to the techniques taught herein will be far smaller than the data streams they are used to encode. Compared to the first data stream 105, the first symmetric encryption key stream 110 is far smaller. Even after asymmetric encryption, the asymmetrically encrypted first key stream is still a comparatively light file. It can therefore be stored and communicated with relatively low burden. In one particular example, a video stream uses a bandwidth of 1 Mbps. In this example AES 128 encryption is used to encrypt the stream, with keys varying rapidly which provides a key stream of 128 bps. The keys are a better fit for asymmetric encryption than data streams.

It should be noted that the key streams, encrypted key streams, data streams and encrypted data streams need not, in fact, ever be stored as on single file. They may be broken down into multiple files comprising portions of the overall stream. In one example, the encrypted data stream is stored in archive as a set of files each containing 15 minutes of data (in one example the data is video or audio data and each file comprises 15 minutes of video or audio). In this example, the encrypted key streams may be stored (optionally) similarly in files comprising the keys of a corresponding file holding 15 minute of data stream. Alternatively, the file breakdown of the keys and data may be different.

Figure 6:
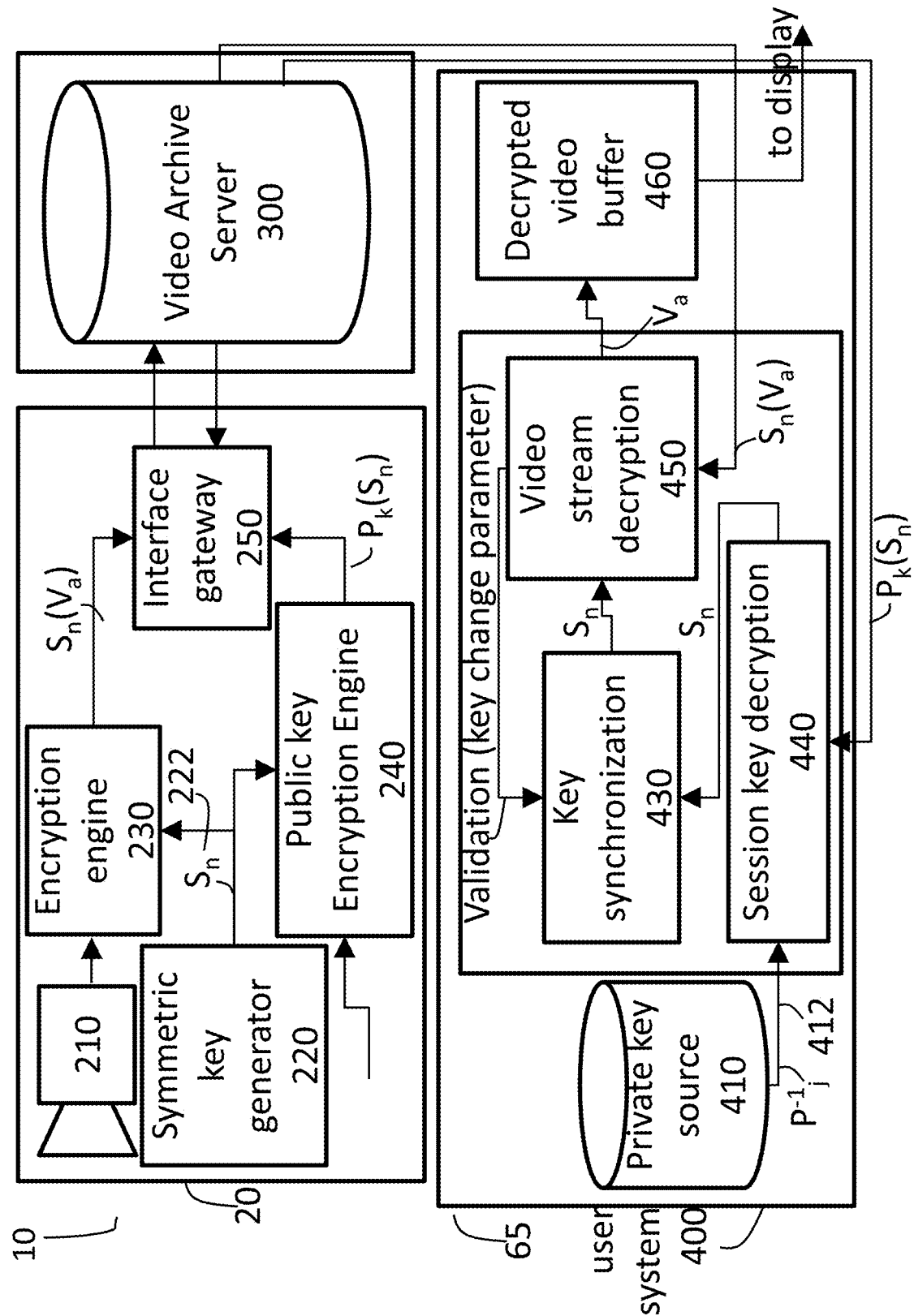
FIG. 6 is another block diagram of the system of FIG. 3 in accordance with a non-limiting example.

FIG. 6 is a logic block diagram showing an overview of the system 10 according to a non-limiting embodiment. As shown, the system still comprises a trusted network zone 20. In the particular configuration shown here, the video archive is used to store both encrypted stream data and asymmetrically encrypted key streams. An exemplary agent station 65, which in this example is a user system 400, has access to stream data via the video archive server 300.

Figure 7:
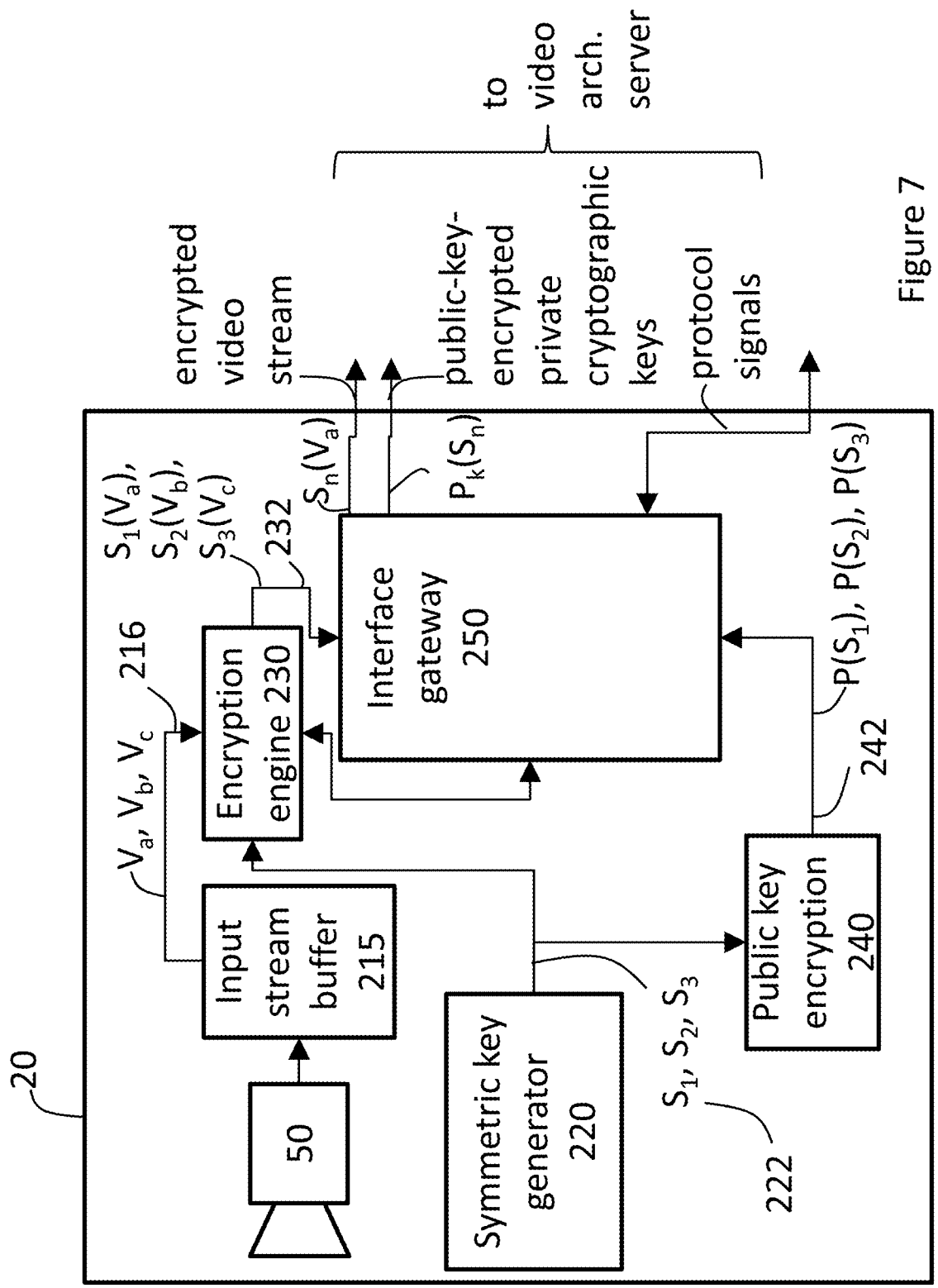
FIG. 7 is a block diagram of a trusted network zone in the context of the system of FIG. 3 in accordance with a non-limiting example.

FIG. 7 shows an enlarged view of the trusted network zone. In this particular embodiment, a data source 50 is a surveillance camera 210 that is within the trusted network zone 20. The encryption computer system 30 of the previous example was a single workstation or server computer system, however in alternative embodiments it may be distributed over several constituent parts. In the example shown in FIG. 7, the encryption computer system 30 is shown as comprising a data input with a stream buffer 215, a symmetric encryption engine 230, a public key encryption engine 240 and an interface gateway 250. A symmetric key source in the form of a symmetric key generator logic 220 is also part of the encryption computer system 30, although in alternate embodiments it may be an external module.

As mentioned the encryption computer system 30 comprises an input for connecting to the surveillance camera 210 and receiving therefrom streaming data. It has been mentioned above that the connection with the data sources 50 may be a network connection. To this end, the input may employ a network interface which may be separate from the interface gateway 250, which in this example is used to interface with an the untrusted network 45. Alternatively, the input may be a direct connection to the data source 50. In this example the data source provides a stream over a packet-based protocol and an input stream buffer 215 accumulates incoming packets to order them appropriately. In this particular example, the input stream buffer 215 is also used to unwrap network layer packets to derive application layer packets.

A symmetric key generator 220 comprises logic for generating symmetric encryption keys ($S_1$, $S_2$, $S_3$, ... ) making up symmetric encryption key streams. In some cases, the symmetric key generator may be provided externally, e.g. by an external service in a trusted communication relationship with the encryption computer system 30, or with another system portion which performs the stream data encryption (e.g. at the data source 50). However, in the present example, the symmetric key generator 220 is at the encryption computer system and comprises software code, e.g. stored in a tangible computer-readable storage, comprising instructions instructing a general purpose (i.e. programmable) processing entity to generate symmetric encryption keys ($S_1$, $S_2$, $S_3$, ... ) in accordance with a key generation algorithm. In this example, Microsoft™ CryptoAPI is used.

The encryption engine 230 comprises logic for applying an encryption algorithm to the stream data provided by the surveillance camera 210 using the symmetric encryption keys provided by the symmetric key generator 220. In the present example, the encryption engine 230 is at the encryption computer system and comprises software code, e.g. stored in a tangible computer-readable storage, comprising instructions instructing a general purpose processing entity to perform the encryption. To that end, the stream data from the surveillance camera 210 is separated into sequential portions ($V_a$, $V_b$, $V_c$, ... ) (in this example, this is done by the encryption engine 230). Each of the sequential portions will be encrypted by a respective encryption key. In this example, where the stream data is video stream that is H.264 encoded, each sequential portion ($V_a$, $V_b$, $V_c$, ... ) is selected to comprise a number of frames beginning with an I frame. In this particular example, each sequential portion ($V_a$, $V_b$, $V_c$, ... ) is subdivided by the encryption engine 230 into payload portions which will, once encrypted, make up the individual payloads of RTP packets. The payload portions may be subdivided according to a size factor (e.g. in terms of time or number of frames). In one example, the encryption engine 230 selects the sizes based on a number of frames and the presence of an I frame. Specifically here, the encryption engine 230 counts a minimum number of frames then selects the next I frame with which to being the next payload portion and places every frame before the selected next I frame into a payload portion then repeats this until the particular sequential portion ($V_a$, $V_b$, $V_c$, ... ) is all used up.

The encryption engine 230 receives a stream of symmetric encryption keys from the symmetric key generator 220. The encryption engine 230 encrypts each sequential portions ($V_a$, $V_b$, $V_c$, ... ) a respective symmetric key and generates an a symmetrically encrypted data stream. In practice, in this particular implementation, the encryption engine 230 calls upon the symmetric key generator 220 at every particular sequential portion that is segmented to request a key ($S_1$, $S_2$, $S_3$, ... ), which it receives in return from the symmetric key generator 220 with which it encrypts the particular sequential portion. This calling may be done by software, e.g. by calling the functionality of a separate symmetric key generator class, e.g. by generating a request to the CryptoAPI.

In the present example, the encryption engine 230 encrypts each individual sequential portion ($V_a$, $V_b$, $V_c$, ... ) of the data stream 216 with a respective encryption key ($S_1$, $S_2$, $S_3$, ... ) to generate a symmetrically encrypted data stream 232 comprised of sequential portions of encrypted data ($S_1(V_a)$, $S_2(V_b)$, $S_3(V_c)$, ... ). In the present example, the encryption engine 230 applies the key stream-based encryption to the data stream 216 in real time keeping no copies of the unencrypted data stream 216.

More particularly in this example, the encryption engine 230 encrypts each sequential portion in chunks that it will place in an RTP packet. Specifically, the encryption engine processes individual payload portions. Optionally, it may add to payload portions other information that is to be encrypted in the encrypted data stream, such as metadata. The encryption engine 230 applies the symmetric encryption of the payload portions, in this example using AES 128 encryption, and creates a packet, in this case an RTP packet, placing a time stamp in the header (which may have been received with, or derived from, the stream data, or generated at the encryption engine 230), as well as payload type information indicative of the type of payload contained and the key index, which it may receive from the key generator 220 or generate itself.

Although in this example, each asymmetrically encrypted key streams like the asymmetrically encrypted first key stream using public key 1 120 comprised only one key stream, it will be appreciated that multiple key streams, e.g. all the key streams associated with one particular entity's (or group's) permission level or a subset thereof. In particular, an encrypted key stream may be created comprising all the key streams for simultaneous data streams to which a particular entity has access permission, e.g. by encrypting them together with the entity's public key.

The public key encryption engine 240 has access (not shown) to the public keys of entities authorized to access the data stream 216. These may have been provided directly by agent stations 65 via any suitable communication system. It will be noted that public keys generally do not need to be securely transferred since they can only be used to encrypt, and not to decrypt, data. The public key encryption engine 240 also receives the symmetric key stream 222, but not for the purpose of encrypting anything with it, but rather to encrypt the symmetric key stream 222 itself. To this end, the public key encryption engine 240 comprises logic for applying an encryption algorithm to the symmetric encryption key stream 222 provided by the symmetric key generator 220 for each of the public asymmetric encryption keys associated with a permission to access the data stream encrypted with the symmetric encryption key stream using the public asymmetric encryption keys. In the present example, the public key encryption engine 240 is at the encryption computer system and comprises software code, e.g. stored in a tangible computer-readable storage, comprising instructions instructing a general purpose processing entity to perform the encryption. The encryption algorithm used in the present example is asymmetric RSA encryption. This algorithm takes the symmetric encryption key stream 222 and using a public key P applies encryption to the stream 222 to create an asymmetrically encrypted key stream 242. In this particular example, the encryption is applied on a symmetric key-by-symmetric key basis such that the asymmetrically encrypted key stream 242 is a stream of asymmetrically encrypted symmetric keys ($P(S_1)$, $P(S_2)$, $P(S_3)$, . . . ). The resulting encrypted certificate-specific key stream is an asymmetrically encrypted selection of key stream (as described further herein, the asymmetrically encrypted key stream can contain only a subset of the symmetric keys corresponding to a particular data stream, where this subset corresponds to a subset of the data stream to which access is granted to the holder of the public key certificate) providing the intended user the ability to decrypt a corresponding selected segments of the encrypted data stream.

The key stream generation, data stream encryption and public key encryption (for each permission-eligible public key) of the key stream may be repeated for additional data stream. For data stream sharing a permission level, if present in the embodiment, the key streams generated may be re-used for multiple data streams, requiring no new encryption of the key stream.

Likewise a group of entities, e.g. a user group, may share a certificate/public key and each have the corresponding private decryption key to provide group-based permission levels. Alternatively groups may be managed simply by generating an encrypted key stream for each member of the group and storing a group association associated with each member, as is the case in this example.

The interface gateway 250 comprises logic directing communication of data from the encryption computer system 30. In the present example, the encryption computer system 30 comprises the symmetrically encrypted data stream 232 and the asymmetrically encrypted key stream 242. Both of which are to be accessed by an agent station 65, but in this particular example, the symmetrically encrypted data stream 232 and the asymmetrically encrypted key stream 242 are stored on the video archiving server 70, which in this case is a server provided as a cloud computing service over the untrusted network 45.

To this end, the interface gateway 250 comprises network interfaces for communicating over the untrusted network 45 and comprises logic for logging onto the remote video archiving server 70 and transmitting thereto, e.g. by streaming protocol, the symmetrically encrypted data stream 232 and the asymmetrically encrypted key stream 242 for storage thereat. In the present example, the interface gateway 250 is at the encryption computer system 30 and comprises software code, e.g. stored in a tangible computer-readable storage, comprising instructions instructing a general purpose processing entity to perform the communication.

The interface gateway 250 may also implement safeguards for appropriately shielding the trusted network zone 20 from the untrusted network 45. This may include firewall logic, proxying logic, packet sanitizing logic, re-encapsulation logic and logic for implementing a DMZ. The encryption computer system 30 and more broadly the trusted network zone 20 may more particularly be protected behind a DMZ implemented at the interface between the trusted network 20 and the untrusted network 45.

In an alternate embodiment, the asymmetrically encrypted key stream 242 may be provided to the agent station 65 not through the video archiving server 70. For example it may be provided to the agent station 65 directly by the encryption computer system 30. To this end, the interface gateway 250 may be suited to receive requests from agent station 65 for the asymmetrically encrypted key stream 242. To this end, the agent station 65 may comprise logic to generate a request, e.g. based upon user input, for a particular data stream or portion thereof. The request may also be for combinations of specific streams or combinations of portions of specific streams. To these ends, the request comprises data identifying the data stream, portion(s) of stream(s) or combination thereof as well as a requestor identifier identifying the requesting entity which in this example is the public key/certificate of the requesting entity. Upon receipt the encryption computer system validates whether the requesting entity is authorized to access the requested stream data. This may involve a traditional validation process, e.g. looking up the requestor identifier in a permissions table. However, in this example, encryption computer system comprises logic for accessing the encrypted key streams for the requested stream data, reading thumbprint information to find the identifier (in this case the public key/certificate), comparing the requestor identifier with the identifier found in the thumbprint, and upon finding a positive match, transmitting the encrypted data stream, or the requested portion to the requestor along with the encrypted key stream. In an embodiment, all or some portions of a data stream are held by an originator entity, and upon successful matching of the two keys, inaccessible portions of the stream data are retrieved from the originator's network. In some embodiments, absent a positive match between the requestor identifier and the identifier found in the thumbprint, the mismatch between requestor identifier and the identifier found in the thumbprint, is automatically converted into an exception request or warrant, and then, subsequently routed to an arbitrating authority, such as a judge, for approval or rejection. In some embodiments, rather than sending both streams, the encryption computer system 30 may cause one or both to be sent, e.g. from a cloud based storage. This verification may be performed once, but in this example it is performed for every sequential portions ($V_a$, $V_b$, $V_c$, . . . ) of the requested data stream or portion thereof, such that if access is only permitted for a portion of the data stream, only that portion will be provided.

Encryption of the data streams may occur at a variety of points in the system 10. In this particular example, encryption occurs within the trusted network zone. More specifically still, in this particular example the encryption computer system 30 performs data encryption of the stream data. To that end, the encryption computer system 30 comprises an input interface for receiving from the data sources 50 the stream data and a network interface such as a LAN interface for communicating within the trusted network zone 20. Although in the example described above, the data stream encryption occurred in the encryption computer system 30 embodied in a server or workstation, it is to be understood that the encryption computer system 30 may be distributed and some functionality thereof may take place, for example, inside the data sources 50. For example, with reference to FIG. 7, the input stream buffer 215 and the encryption engine 230 may be comprised within the data source 50 which comprises the surveillance camera 210. The symmetric key generator 220 may be an external source, but in this alternate example it is also a module of the data source 50. As such the data source 50 outputs an encrypted data stream that was encrypted in real-time preserving no copies of the unencrypted data, as well as the symmetric encryption key stream. The data source may also be considered outside of the encrypted computer system 30. The symmetric encryption key stream may be provided via a trusted link, optionally using an encrypted connection to the encryption computer system 30, which retrieves the symmetric encryption key stream (decrypting them if necessary) and proceeds to encrypt them using the public key of permission-eligible entities.

Alternatively still, even this functionality and that of the interface gateway 250, can be moved to the data sources 50 with each data source 50 applying encryption as required to both stream data and key stream such that at no point is unencrypted data transferred even within the trusted network zone 20. For this embodiment, it may be useful to implement a centralized controller logic to govern collection and distribution of users/entities and their respective public keys and to ensure up-to-date permissions directories among all the distributed portions of the encryption computer system 30 throughout the data sources 50.

Returning to the example of FIG. 7, a controller logic (not shown) is also implemented in this example to govern collection of users/entities and their respective public keys and to ensure that the permissions directory 80 is up to date. The controller logic, may comprise logic for adding or removing permissions, and to this end, it may be a software module comprising computer-readable instructions stored on a tangible computer-readable storage comprising instructions instructing a general purpose processing unit to update the permissions directory 80 to add, modify or remove entries, and to cause a corresponding addition, modification or deletion of the asymmetrically encrypted key stream corresponding to the permission change. For example, if a new permission is granted for a particular public key for a particular data stream (and, e.g., for a particular time period), the corresponding entry is added to the permissions directory 80, and the symmetrical encryption key stream* is accessed in a memory. The key streams may be stored locally at the encryption computer system 30 or, as in the example of FIG. 6, at the video archive server 70. Either way, to provide data security while allowing the encryption computer system to access the key streams to re-encrypt them to modify permissions, they may be stored encrypted using a public key which belongs to the encryption computer system 30 (the encryption computer system 30 having the corresponding private key). Once the key stream in question is retrieved (and if need be, decrypted), the encryption computer system, under directions from the controller logic, encrypts a copy of the key stream with the public key for which permission is to be granted.

If permission for only a subset (or portion) of the data stream is to be granted, this may be done by accessing the encrypted data stream. As described, the encrypted data stream comprises an unencrypted portion, which may comprise data identifying different portions and corresponding encryption keys. The encryption computer system 30 finds the subset of the data stream based on the portion identifying data and finds the corresponding portions of the key stream based on the key identifying data. For example, in a particular embodiment described above, the data stream comprises sequential portions ($V_a$, $V_b$, $V_c$, . . . ) that comprise RTP packets comprising in an unencrypted header a time stamp and a key index. The encryption computer system 30 may comprise logic for receiving a request for a particular time subset of a data stream and select the corresponding sequential portions ($V_a$, $V_b$, $V_c$, . . . ) based on the time stamps. The encryption computer system 30 may further comprise logic for identifying a corresponding encrypted key stream on the basis of an entity identifier stored in a non-encrypted portion thereof. In this particular case, the non-encrypted portion may comprise the public key/certificate itself. The encryption computer system 30 may further include logic for identifying the particular keys (which in this case are a portion of the encrypted key stream) corresponding to the portion of the data stream in question, decrypt the portion of the encrypted key stream comprising the keys using its own private key, and reencrypting these keys using the public key of the requestor and generating a new encrypted key stream as described herein. Thus a newly generated key stream can hold only a subset of the original symmetric keys to limit the visibility of the data granted over an elementary stream to, e.g. only a period of time for a video stream. In this manner a permissions granularity may be implemented whereby different third parties may have access to different streams but also to different subset(s) of stream(s). In this example streams are so divided into subsets that are delimited by changes in the symmetric keys such that a subset of a stream to which permission is granted corresponds to one or more portions of the stream, each entirely corresponding to a respective symmetric key. Although in the present example, subset key streams are created as described above by decrypting and reencrypting an encrypted key stream, it is conceivable that the symmetric key stream would be simultaneously encrypted (e.g. by the public key encryption module 240) using multiple public keys to generate from the start multiple different access permissions. In such a case the different public keys may be used on different subset portions of the symmetric key stream 222 to provide granular/differentiated access to the related data stream to different entities.

Although providing new permissions has been described as being done by the encryption computer system 30, in one embodiment, the encryption computer system 30 has no public/private key pair. It may be able to encrypt symmetric key streams as described herein but may keep no copies of the unencrypted key streams once encryption is complete. The permission-granting functionality and logic described above may be provided in the agent station 65. In this example, only an entity having access to a particular data stream or portion thereof may grant access to another entity. To this end, the agent station 65 may comprise an encryption engine 230. Thus the unencrypted key stream may be discarded in favor of reliance on permission granting from an authorized entity which has access to the encrypted key stream to grant access to other tiers. Likewise, the unencrypted data stream may be discarded keeping only the encrypted data stream in order to minimize the risk of there being a compromise of the data stream.

Thus the agent station 65 may receive requests to grant access to a particular data stream to a third party. This request may come from the system 30 or from the third party or from elsewhere. To this end, the agent station 65 may receive a third party public key belonging to a third party public-private key pair where the third party private key is held secretly by third party and thus unknown, e.g. to the agent station 65. The agent station 65 may comprise logic for receiving the request and performing a permission grant comprising decryption of a corresponding key stream and reencryption of the key stream using the third party public key as described herein. Moreover, the agent station 65 may first perform a permission verification, e.g. using a table or by other means as described and may thus comprise logic, e.g. in the form of software instructions programmed by a skilled programmer therefor. The permission grant may be performed on the basis of determining that the third party is authorized to access the data stream. Conversely upon determining that the third party is not authorized, the permission grant may be not performed. Of course, the request may be for only a portion of a data stream and accordingly only a corresponding portion of the corresponding key stream may be reencrypted. Also, verification may reveal that the third party is authorized to only a subset portion of the data stream, in which case the permission grant may be only performed upon a portion of the key stream corresponding to a portion of the data stream to which the third party is authorized access as determined by the verification. Having reencrypted the key stream (or a portion thereof) the agent station 65, may then transmit the reencrypted key stream either to the third party or to a server such as a video surveillance server, e.g. over untrusted network. Here too, where permission granting is performed by an agent station 65 granularity may be implemented as above, by reencrypting only a subset of the symmetric key stream corresponding to the subset of the data stream to which access is to be granted, such that the resulting reencrypted key stream contains the symmetric keys corresponding to the subset portion of the data stream to which access is to be granted.

The agent station 65 comprises the logic described herein which may be a computer system and may be embodied with computer readable instructions stored on a tangible storage medium for instructing a general purpose processor to perform the function described herein as may be programmed by a skilled programmer. In one non-limiting embodiment, the agent station comprises a video surveillance client software running on a general purpose computer. The agent station 65 may comprise logic for processing data streams to do something useful and/or tangible with them. For example, the agent station may comprise logic such as software code for presenting information comprised in data streams to a user, e.g. graphically or audibly. For example, the agent station 65 may comprise video and/or audio decoders, (e.g. MPEG compliant decoders) for decoding video streams as well as software and/or graphics hardware to present the video on a monitor to a user. Likewise the agent station 65 may comprise the necessary logic for causing audio to be output over speakers to a user.

The video archive server 70 holds the symmetrically encrypted data streams along with, in this example, the asymmetrically encrypted key streams. This data is made accessible to entities at agent stations 65, for example by providing it via cloud storage, which may itself implement user validation/login and permissions verification by other means. In such a case, the two layer encryption scheme provides added security, particularly in case the cloud storage is compromised. Even in the case of local archiving at the encryption computer system 30, the two layer encryption is advantageous. For example, technicians may be able to access data stored in the archives as part of their work, however sensitive data streams may still be occluded from them by being stored encrypted. Thus the enforced permissions are quite robust. And if the archiving system itself were to be hacked or compromised, the system offers added protection against unauthorized access.

Thus, according to one embodiment where the storage server is not trusted to store the original data stream and the key stream, we create a new encrypted public key-specific key stream. By design a first authorized entity (e.g. at agent station 65) may generate an encrypted public key-specific key stream for another authorized entity which corresponds to all, or only a subset, of the symmetric key stream. To this end, it may access an encrypted symmetric key stream stored on the storage server 300 which was encrypted using the first authorized entity's public key, decrypt it, or the subset thereof, using its private key and reencrypt it, or the subset, using the second authorized agent's public key. The resulting reencrypted key may be published to a central server such as the storage server 300.

Figure 8:
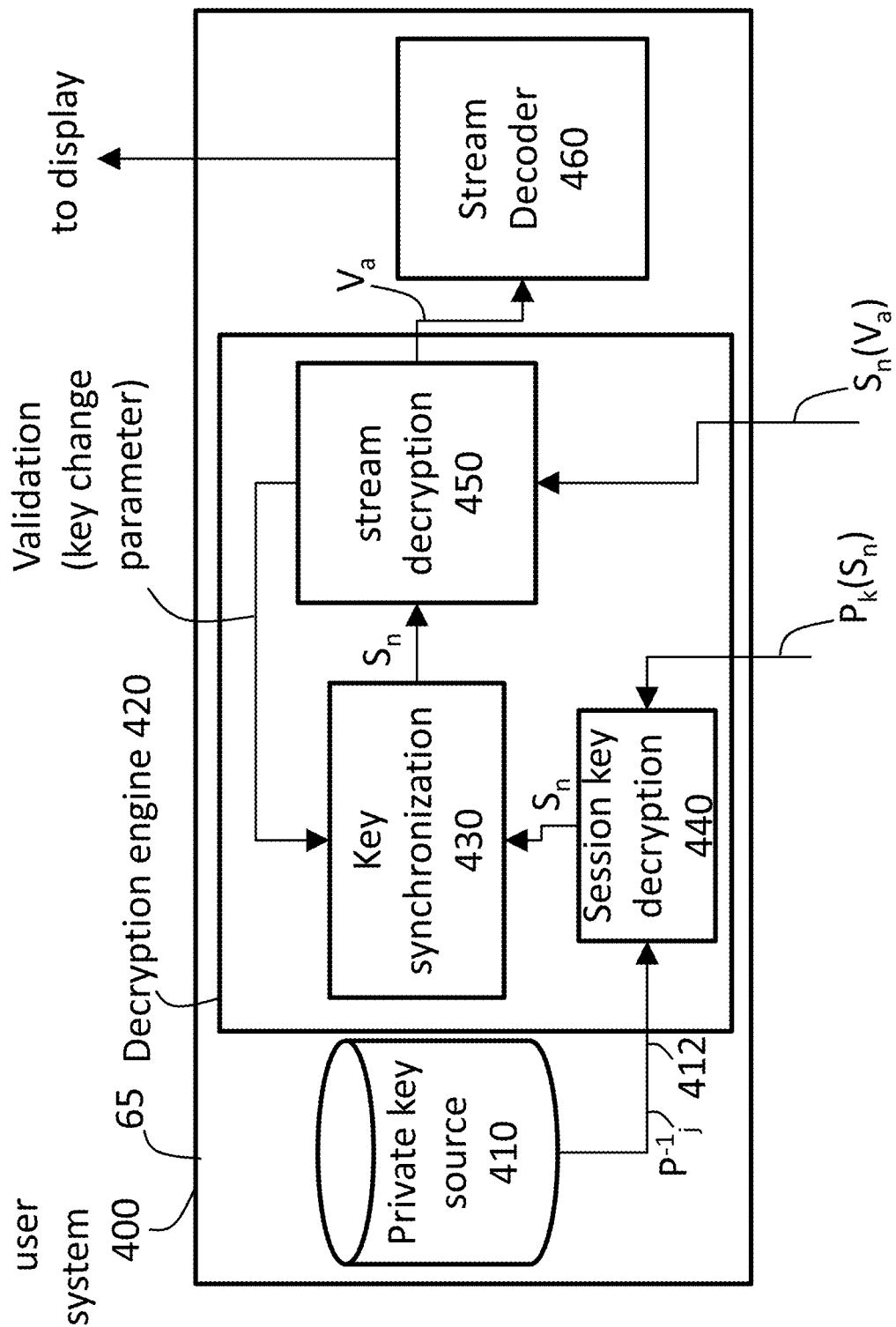
FIG. 8 is a block diagram of a user system in the context of the system of FIG. 3 in accordance with a non-limiting example.

Turning now to FIG. 8, the user system 400 of FIG. 6 is shown in more details. As shown the user system 400 comprises a private key source 410 which stores the private key $P^{-1}_j$ 412 which corresponds to the public key $P_k$ provided to the encryption computer system 30. The user system 400 comprises a network interface (not shown) for communicating over at least one network, in this example the untrusted network 45, to obtain symmetrically encrypted stream data and corresponding asymmetrically encrypted key stream data.

For illustrative purposes, in one example the user system 400 has the public key Pub_Key_135 and requires access to the First stream data 105. In this example, the video archive server 70 sores both this data. In response to a user input at the user system 400, the network interface of the user system 400 formulates a request to the video archive server 70 for the first stream data 105. Data streams may be identified by any suitable manner, for example using a stream Global Unique Identifier (GUID). In response, the video archive server 70 retrieves from its memory the first symmetrically encrypted data stream 115.

In one particular embodiment, because all the key streams are encrypted, rather than having to perform request validation, upon a request for content, the encrypted content (e.g. first symmetrically encrypted data stream 115) is sent in response alongside all of the corresponding encrypted key streams (e.g. the asymmetrically encrypted first key stream as encrypted using all public keys used). Since the asymmetrically encrypted key streams are not very voluminous data-wise, this is a suitable solution, particularly where there are relatively few different entities or permission groups. Thus the user entity 400 receives all the encrypted key streams. These may identify the public key that was used to encrypt them, e.g. in header fields, allowing the session key decryption module 440 to determine for each encrypted key stream whether it is decryptable with the private key 412. Alternatively, the session key decryption module 440 may simple attempt to decrypt every encrypted key stream received and identify the one that provides usable data.

Alternatively, however, the video archive server 70 implements an access control to verify the identity of requesters, providing encrypted data streams only if the request corresponds to a public key or entity that has access permission to the data stream, e.g. that has a corresponding asymmetrically encrypted key stream. In one example, a device receiving a request for a data stream or more specifically for the decryption keys for a data stream (e.g. video archive server 70, but alternatively the encryption computer system 30, if that is where encrypted key streams are kept) receives with the request the public key/certificate of the requestor and comprises logic, (e.g. software code, e.g. computer-readable instructions to a general purpose processor) for comparing the public key/certificate with a field in encrypted key streams comprising the public key/certificate corresponding to the stream. This may be the sole verification or may be a redundant verification performed after first, e.g. looking up an identifier (public key or otherwise) associated with the requestor in a permission directory, for example a directory comprising a key stream table matching encrypted key streams to respective entities.

In an alternative embodiment the encryption computer system 30 stores the encrypted keys locally. In this example, the network interface of the user system 400 may send the data request, for example, to a permission validator on a proxy server that validates the permission using technology described herein or otherwise and upon validating the request transmits an authorized access request to the encryption computer system 30 and (if the encrypted data streams are stored in the video archive server 70, and if this is separate from the encryption computer system 30) to the video archive server 70 instructing both of these entities to transmit to the requestor their respective portions of the required data to derive the data stream. Rather than being provided on a proxy server, the permission validator may be provided on either one of the encryption computer system 30 or (if separate) the video archive server 70). Alternatively still, each of these may separately perform the task of validation the requestor permission ad described.

Figure 9:
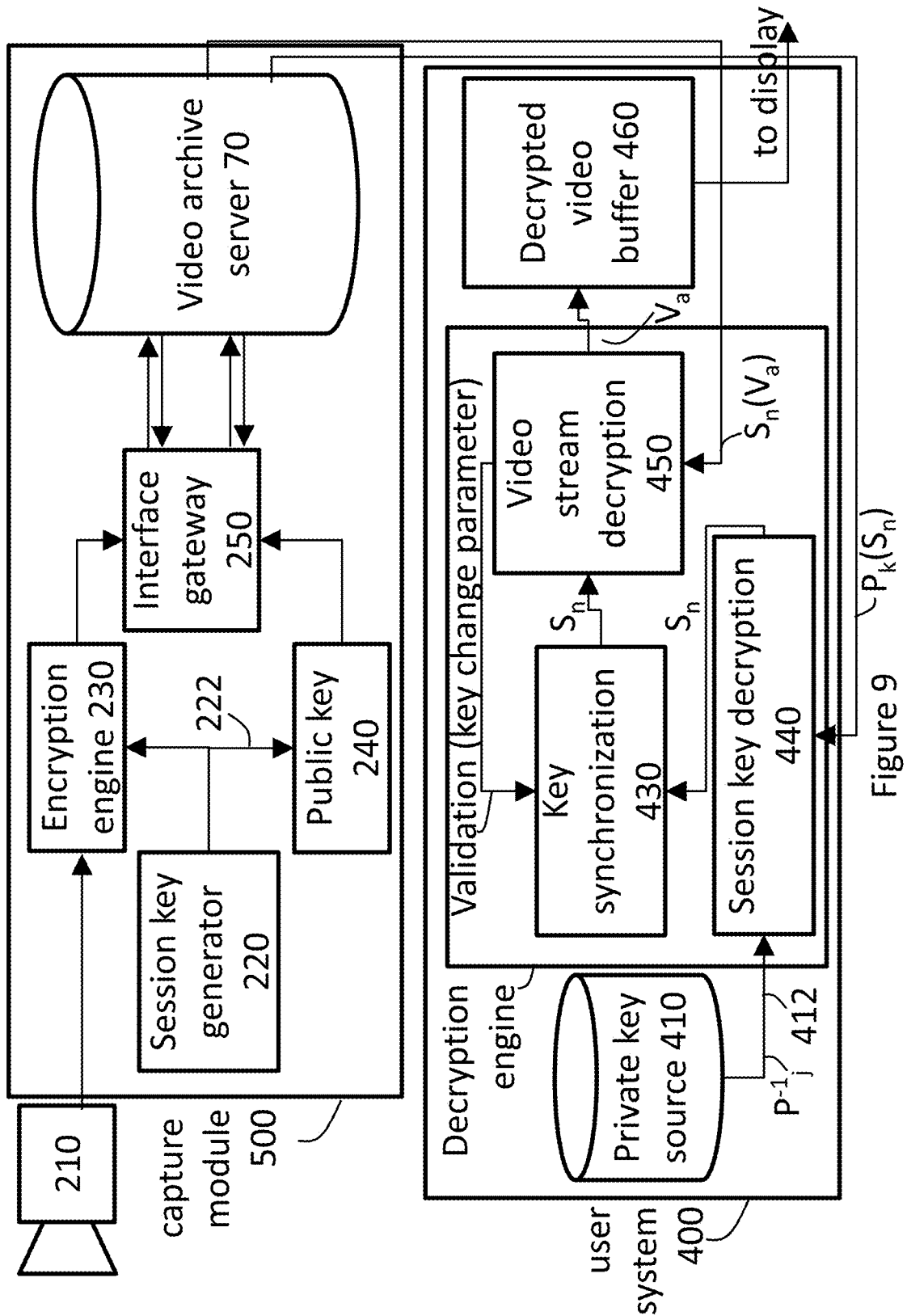
FIG. 9 is a block diagram illustrating a video surveillance system in accordance with a non-limiting example.

FIG. 9 shows a system wherein the video archive server is comprised within the encryption computer system 30. The logic of the video archive server 70 may thus be comprised within the encryption computer system 30. Validation of request is performed at the video archive server 30.

In one particular embodiment, encrypted data streams may be streamed directly to the agent station 65 (e.g. and to other authorized recipients) by the encryption computer system 30 upon encryption. This may be done before, or simultaneously with storage in the video archive server 70, whether the server is within or external to the encryption computer system 30. Transmission of the encrypted data streams and of the encrypted key streams, even if stored at the same entity, may be done separately. In one particular embodiment, the encrypted data stream may be multicast to all recipients while encrypted key streams, which may be different for different recipients are sent via a 1:1 connection with each client, e.g. agent station. It will be noted that archivers may never decrypt data streams and key streams and may be devoid of such ability (e.g. by not having access to unencrypted decryption keys). In particular, symmetric keys and unencrypted data streams may be never persisted. In such a case the granting of new permissions may be done by already-authorized entities that can decrypt the encrypted key stream as described.

The session key decryption module comprises logic for decrypting an asymmetrically encrypted key stream using the private key. The logic may be in the form of computer-readable instructions stored on tangible computer-readable storage comprising instructions instructing a general-purpose processing entity to perform the decryption. Upon receipt of the asymmetrically encrypted first key stream using Public Key 1 120, the session key decryption module applies the (e.g. RSA) algorithm to decrypt the encrypted key stream to retrieve the first symmetric encryption key stream 110, $S_n$.

The session key decryption module comprises a video stream decryption module 450 which comprises logic in the form of computer-readable instructions as above for decrypting the encrypted stream data obtained by the network interface. In this example the first symmetrically encrypted data stream 115 has been received and comprises sequential portions of encrypted data $S_n(V_a)$.

In one example, each sequential portions of encrypted data $S_n(V_a)$ is transmitted in a corresponding one or more application layer packet. The application layer packet comprises timing information, e.g. a time stamp, indicating a particular chronological value for the particular sequential portions of encrypted data $S_n(V_a)$ and may also comprise a key index. The symmetric encryption keys $S_n$ of the decrypted symmetric encryption key stream $P_K(S_n)$ are associated with a temporal reference, e.g. time stamp and/or key index, to their respective sequential portions of encrypted data $S_n(V_a)$.

A key synchronization module 430 searches identifies the key index in each application layer packet, in this example in the header of each RTP packet of the encrypted data stream. Optionally, the key synchronization module also identifies a time stamp in the header. The key synchronization module finds the key in the key stream corresponding to each particular portion of the encrypted data stream. To this end, it searches for the key index, which may be in an unencrypted portion of the encrypted key stream, but which in the immediate example is in the encrypted portion of the key stream. Since the session key decryption module 440 decrypts the encrypted portions of the encrypted key stream, the key index is searchable by the key synchronization module. Optionally, the key synchronization module 430 uses the time stamp data from the encrypted data stream to narrow the search of decrypted keys by searching only keys having a time stamp (if present) that is near (e.g. within a certain threshold of) the corresponding portion of data. Alternatively it may use the time stamp to select a starting point and search the key stream by progressing ever further from the time stamp time. The key synchronization module 430 may also derive how long a particularly asymmetric key is to be used, that is for how much of the encrypted data stream. For example, if an RTP packet points to a new key index (compared to the previous one), the key synchronization module 430 may assign the corresponding key until an RTP packet has a new key index, or it may use lifespan information about the key stored within the key stream to determine how long the key must be used. The key synchronization module 430 may also use both, e.g. continuously assigning a key until either a new key index is found in the encrypted data stream or the lifespan expires. Instead of the key index, the key synchronization module 430 may match other values, e.g. time stamps only.

The user system 400 further comprises a stream decryption engine 450, which in this example is a video stream decryption engine but which could be for decrypting other types of stream data. The stream decryption engine 450 comprises logic for applying a decryption algorithm to the encrypted stream data (in this example this is done to the first symmetrically encrypted data stream 115) received by the network interface. In the present example, the stream decryption engine 450 is at the agent station 65 and comprises software code, e.g. stored in a tangible computer-readable storage, comprising instructions instructing a general purpose processing entity to perform the decryption. To that end, the encrypted stream data comprising sequential portions of encrypted data $S_n(V_m)$ received in this example from the video archiving server 70 received and separated into its sequential portions of encrypted data $S_n(V_m)$ if not already done.

Generally speaking, the stream decryption engine 450 applies a decryption algorithm whereby the encrypted stream data is decrypted using the decryption key stream. In this particular example, the stream decryption engine 450 identifies for each sequential portions of encrypted data $S_n(V_m)$, the proper symmetric key $S_n$ from the symmetric key stream with which to decrypt the sequential portions of encrypted data $S_n(V_m)$ by extracting a key index, a time stamp or both, and providing it to the key synchronization module 430. In response, the key synchronization module provides the stream decryption module 450 with the proper key $S_n$ with which to decrypt the sequential portion of encrypted data $S_n(V_m)$. The stream decryption module 450 then applies the (e.g. AES 128 bit) decryption algorithm to retrieve the particular sequential portion of the data stream encrypted in the sequential portion of encrypted data. This is repeated sequentially for each of the sequential portions of encrypted data $S_n(V_m)$, e.g. as they are received from the network interface. (They may be stored locally for buffering or for later decryption as well, in which case they may be received from local memory.)

In this particular example, the stream data is video data. The so-decrypted stream data is then fed to a stream decoder module 460, which in this example is a video decoder (e.g. an MPEG4/AVC decoder) although it may comprise other decoders including audio decoders and others which receives the now-decrypted stream data in the form, in this example, of sequential portions ($V_a$, $V_b$, $V_c$, . . . ), and decodes them for rendering on a display.

Figure 10:
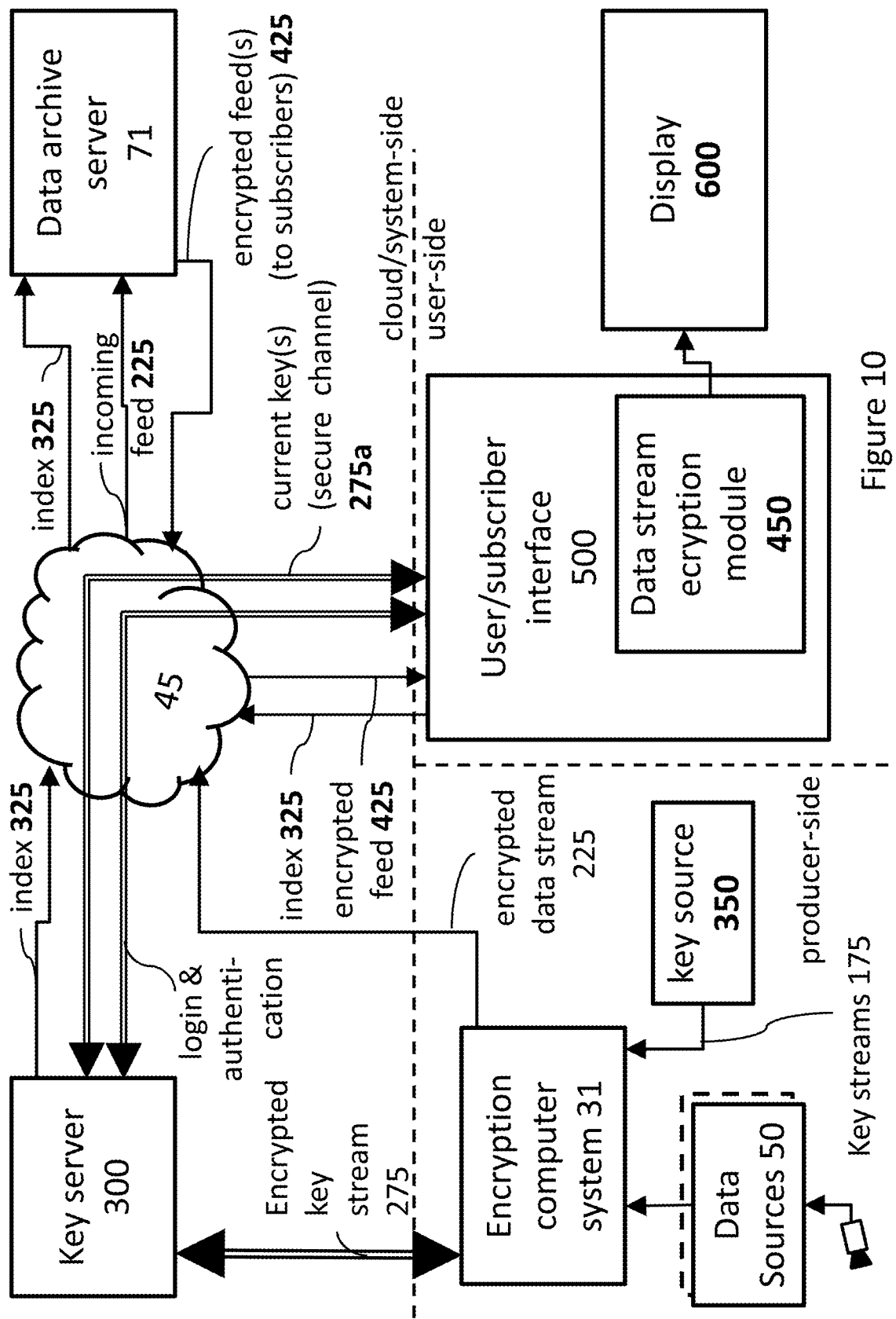
FIG. 10 is a block diagram of a video surveillance system showing exchanged data.

Other embodiments will now be described. In an alternative architecture, the asymmetrically encrypted key stream data may be stored on a separate key server 300 accessible over the untrusted network 45. With reference to FIG. 10, the system 10 in the illustrated embodiment may comprise one or more physical data servers (e.g. in a cloud service, together referred to as data archive servers 71). The servers are configured with the ability to receive incoming data feeds 225 and either store or immediately serve these feeds by way of return feeds 425 to users or subscribers. The serving of the return feeds 425 is performed by the data server(s) 71, while a key server 300, stores encrypted key streams 275, such as the asymmetrically encrypted key streams described above, in a secure database. The key server 300 can securely access, and transmit encrypted keys 275a relevant to decrypt a specific return feeds 425 to permission-eligible users/subscribers. Note that the return feeds 425 may be identical to incoming feeds 225 into the data archive server 71 which are encrypted data streams 225 transmitted by an encryption computer system 31. The encrypted keys 275a and return data 425 are transmitted to users/subscribers whether the latter wish to stream a live feed or alternatively view a feed archived within the data archive server 71. Thus the data video archive server 71, is configured with live re-transmitting technology to receive and immediately re-broadcast stream data (and optionally in other embodiments, encrypted key stream data) to agent stations 65 for, e.g. instant playback thereat. Advantageously, a data archive server 71 with sufficient bandwidth could therefore simultaneously archive and re-transmit stream data and act as a single point of contact (alongside, in some cases, the key server 300) for agent stations 65.

The data archive servers 71 contain stream data stored in encrypted form 425. It will be appreciated that such encryption renders stored contents significantly more inaccessible to unauthorized parties than if servers maintained data in unencrypted form. Moreover, if the storage media of the data archive server 71 or even the facilities in which they are housed are breached or otherwise compromised, their encrypted contents remain inaccessible to would-be attackers.

With continued reference to FIG. 10, one or more data sources 50 produce stream data 101 which is provided to an encryption computer system 31. The encryption computer system 31 encrypts the stream data 101 with a symmetric encryption key, which in this example is provided by an external key source 350, which may be a premises of the encryption computer system 31, or may be provided by a trusted external service through a trusted connection. The key source 350 provides one or more symmetric encryption keys streams 175 to encryption computer system 31 which uses them to encrypt stream data 101 as well as encrypts them using the public keys associated with access to the stream data 101. The encrypted key streams 275 are then transmitted by the encryption computer system 31 to the key server 300. In this example, the keys (key stream) are encrypted using asymmetric encryption before being stored on the key server. The public key of the user who is allowed to access the content is used to encrypt the key stream. A separate key stream is generated for each user who is granted access to the data, and for each data stream.

Users typically connect to the service by way of a user/subscriber interface 500. Users may access content stored in the data archive server 71 by way of key validation capability being provided by the key server 300 (on top of providing access to the user's respective encrypted key stream) while the data archive server 71 streams or otherwise transfers the return data 425. Any validation method described herein or known may be used, e.g. to ensure that only users having a key stream encrypted with their public keys have access to the encrypted data stream and/or key stream. The decryption typically occurs using a data stream decryption module 450, such as using technology provided herein, at, e.g., the location of the user/subscriber's workstation.

Data streams 101 may comprise video or other multimedia data. It will be appreciated that other types of data feeds or data streams may likewise be comprised within data streams 101, as appropriate, in other embodiments. Such data feeds may non-limitingly include any combination of video, audio, text, or any other data represented or encapsulated using any format—whether open or proprietary. In addition, returned data 425 streamed to a user/subscriber may have been previously stored within the data archive server 71 and provided on demand to a successfully validated user/subscriber interface 500. Likewise, the returned data 425 may have been produced moments before being streamed 425 to said user/subscriber interface 500.

Data streams 101 introduced into embodiments from any data source 50 and through any possible secured encrypted transit means are subsequently transferred to an encryption computer system 31. The encryption computer system 31 encrypts the received streams 101 using the key streams 175 which are also usable here to decrypt the data stream.

In a further embodiment, parameters may be specified within the user/subscriber interface to select from among various encryption schemes and scope. No particular limitation on technologies, unless otherwise specified or technically infeasible, is envisioned for encryption specification (e.g. AES-128, AES-192, AES-256), signatures or key exchange (e.g. RSA 2048) or integrity checks (e.g. SHA-256 cryptographic hash functions), for any embodiments herein].

In another embodiment, encryption policy may be advantageously implemented by considering the bitstream specification or format of a video stream to encrypt. For example, encryption may be directed exclusively toward a stream's various sequence payloads 331, 331', leaving unencrypted the various sequence headers 330, 330' and sequence trailers 332, which contain less fundamentally valuable metadata. It will be readily appreciated that this notion may be adapted and applied with greater discrimination and granularity to a lower layer of the bitstream specification or hierarchy, and be thus directed toward contents of individual sequence payloads 331. In such cases, headers 333 and trailers 335 of individual frames may remain unencrypted, while frames themselves 334, 334' are encrypted with one or more keys 275. Analogously, encryption keys 275 may be assigned exclusively to the image blocks 337, 337' of individual frames 334, with image headers 336 and trailers 338 remaining unencrypted. The application of such a scheme may be adapted to encompass other formats, while maintaining the underlying principle described above, namely by encrypting the body or payload of data to transmit, but not encrypting the supplemental header data whose contents may likewise not be reverse-engineered to reveal any part of said payload. It may also be adapted and applied to the various formats of streams 100 either captured 50 or created 101. For instance, the application of the foregoing notion to MPEG video—and non-limitingly to specific blocks, macroblocks, P-frames, or groups of pictures within a sequence, may be likewise contemplated and implemented. In a similar manner, separate cryptographic keys 275 or streams of keys 275 may be contemplated and directed to I-frames and B-frames, while the remainder of a MPEG video sequence is transmitted to, stored within, and retrieved from the video archive server in unencrypted form.

In general, as described herein, keys are used herein within a context of a key stream whereby in a series of cryptographic keys 175, each key is associated with successive portions of a stream 100, and may be generated for sequential access or playback of a stream. For example, a single key may allow decryption of thirty seconds of a specific video stream. To play back an entire video stream in its entirety, all cryptographic keys of the key stream 175 generated by the key source 250 for the stream must be available to a potential user/subscriber (i.e. he must have the necessary authorization/permissions to access or otherwise possess said keys).

Figure 12:
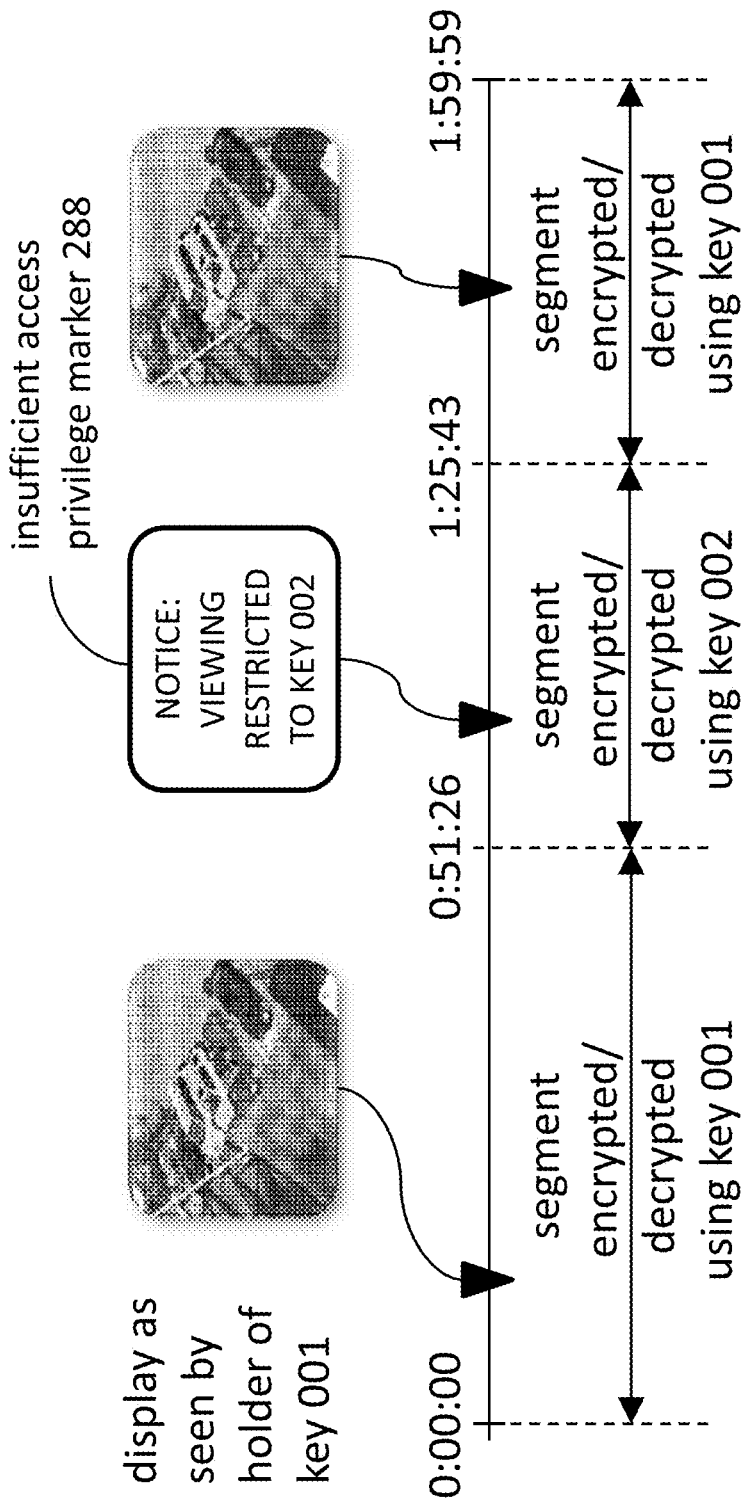
FIG. 12 is a conceptual illustration of a video sequence comprising portions to which viewing permission is granted and portions to which viewing permission is not granted.

Variations on the above theme may likewise be contemplated, for example as depicted in FIG. 12, which illustrates a hypothetical scenario wherein a user has only one of the two keys required to decrypt and fully view a stream 101. The stream 101 to view is subdivided into three encrypted segments, with the middle segment requiring a key to which the user does not have access (e.g. he has not been granted permission to have it or he has omitted to obtain it). Various handling techniques may be contemplated, including without limitation the substitution of a synthesized visual or audio information message throughout part or all of the segment of the video (or text or other data) stream. Such a message, or insufficient access privilege marker 288, may inform the user/subscriber that decryption for a particular segment of the stream being viewed may not be carried out because of an absence of the necessary decryption key(s) 175 to do so. In a further embodiment, identification information for said missing key(s) 175, or other information to resolve the restriction may be supplied with the insufficient access privilege marker 288 so that authorized user/subscribers may contact authorized personnel for support or other redress.

Figures 13A, 13B:
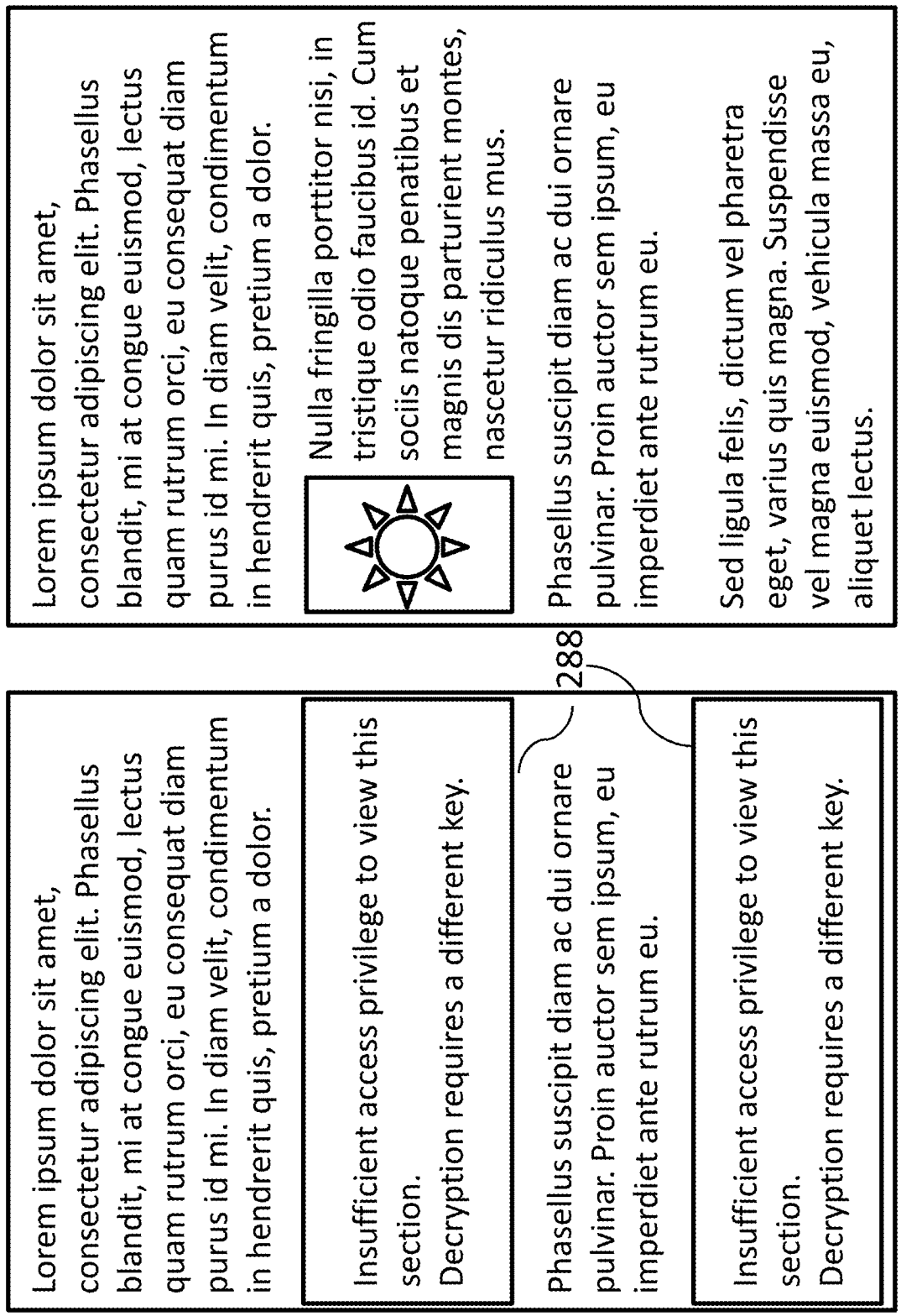
FIG. 13a is an illustration of a rich-text file containing sections to which viewing permission is not granted.
FIG. 13b is an illustration of the rich-text file of FIG. 13a permission is granted.

A similar privilege restriction handling process may be implemented for streams whose content comprises elements not of a purely video nature. FIG. 13*a* and FIG. 13*b* illustrate an example featuring a rich-text file containing sections to which access is not permitted to a user not in possession of the key or keys 275 necessary to decrypt portions of said file's content. In a manner analogous to the foregoing example, an appropriate insufficient access privilege marker 288 appears in the sections of the rich-text file whose decryptions require an additional key 275.

The stream 100 access policy to implement and enforce using a specific key policy may be specified within an appropriate module and by any appropriate user or personnel. In one non-limiting example, such functionality might be included within the user/subscriber interface 500 accessible to one or more individuals having direct responsibility for managing one or more streams. In another embodiment, a single, default policy may prevail for all streams. The process by which such keys are provided to a user/subscriber are further discussed herein.

Once a key policy is ascertained and/or specified, the key source 250 may generate or otherwise supply the key(s) 175 that the encryption computer system 31 will receive and with which the latter will encrypt the data streams. Once encryption of the data stream is carried out (in accordance with any previously determined access policy and/or supporting encryption scheme), the encryption computer system 31 in embodiments issues one or more encrypted key streams 275 (one key stream for each user or group of users who can decrypt the data stream) to the key server 300 for their storage therein, and prepares the corresponding encrypted video (or other encrypted data type) 225 for transmission toward either the data archive server 71 and/or, simultaneously, to the user/subscriber interface 500. The latter simultaneous transmission to the user/subscriber interface 500 may be desirable in embodiments (or, alternatively, circumstances) where live streaming of an event captured in a specific stream to a substantial number of concurrent subscribers' individual user/subscriber interfaces 500 would otherwise put undue performance on the overall traditional architecture disclosed in embodiments herein.

In embodiments, the encryption computer system 31 may include functionality to render it configurable by cloud- or system-level maintenance personnel. Such functionality may include, without limitation, configuration information regarding the destination (e.g. URL) to which to transmit encrypted data packets. Destinations may typically include one or more data archive servers 71 and/or one or more user/subscriber interfaces 500 (though the latter may not be necessary where agent stations 65 are responsible for "dialing in" to request data). It will be appreciated that in a further embodiment, more than one destination may be specified at a time. This may occur for instance in situations where a stream is to be shared live by a user with multiple (other) users/subscribers 500 in addition to being stored for later retrieval within the archive server. The encryption computer system 31 may comprise logic for receiving and configuring and using for encryption the user certificates/public keys fo the users/subscribers 500 as already described herein. As well as for validating users, e.g. using the public keys.

The nature of the various configuration settings comprised within the encryption computer system 31, as well as the authorization granted to specify and/or modify said configuration settings, should be understood as being commensurate with the needs of a specific embodiment. In an embodiment, configuration settings may for example include the possibility to select from among various available encryption methods and standards to be applied to data streams. The opportunity to specify one or more default data archive servers 71 to which to transmit encrypted data feeds may likewise be present. Any one or more of the configuration settings available within the encryption computer system 31 may similarly be subject to appropriate policy restrictions, with certain settings being shared or alternatively made accessible only to one or more parties, such as service maintenance personnel, a user/subscriber who initially uploads a stream, another user/subscriber that accesses said stream, as through a user/subscriber interface 500. It will be appreciated that in many embodiments the individual(s) viewing a decrypted video stream (through their own respective user/subscriber interface 500), may not provide control input or certain kinds of configuration data to the encryption computer system 31, such configuration being reserved to network operators and/or other trusted service maintenance personnel. Such configuration settings, when accessible, may be accessed, specified, or viewed within an appropriate or dedicated part of the user/subscriber interface 500. In view of the foregoing, any conceivable permutation may be envisioned and implemented, consistent with the deployment needs for a specific embodiment.

It will be appreciated that any number of possible cryptographic implementations may be envisioned for the cryptographic keys produced by the encryption module 200. It will be further appreciated that any part of the architecture described herein may be rendered compliant with any existing or future cryptographic and/or security standards (including, without limitation, HIPAA, HITECH, NERC CIP, etc.), and may be furthermore adapted for use in any one or more specific fields. In a further embodiment, multiple encryption types, categories, and combinations may be specified through the interface 500 e.g. by an administrator of said embodiment. Specific permissions for purposes of sharing encrypted feeds with other recipient users/subscribers may likewise be specified within the user/subscriber interface 500, with said feeds remaining encrypted until said recipient users/subscribers download 502 the feeds 425, download 501 the latter's corresponding keys 275, 275*a*, engage the decryption module to locally decrypt, and, on an appropriate destination display device 600 open/display 601 them.

In particularly large-scale embodiments in which typically large numbers of data streams 225 and (correspondingly) key streams 175 are present, the key server 300 may be outfitted with the resources necessary to implement robust access management both of encrypted key streams 175 and of corresponding encrypted data streams 225, that may be provided to users/subscribers. User authentication capabilities are typically implemented within the user/subscriber interface 500, which receives any number of appropriate user/subscriber authentication credentials. Moreover, such capabilities are typically implemented in embodiments using technologies and best practices known in the art and with a view to deliver strong authentication for securing enterprise information. An authentication process to the user/subscriber interface 500 may in embodiments be advantageously and separately contemplated from the authentication of a would-be user/subscriber to the key server 300.

In addition to receiving the key streams 175 from the encryption module 200 (or alternatively, in other embodiments, from the key source 250 itself), the key server 300 also manages transactions whereby user requests to retrieve one or more key streams 175 are fulfilled or denied, in accordance with access privileges or permissions allowed by the authentication credentials. Accordingly, the key server 300 receives at least a portion of the login and authentication 350 credentials from the interface 500, and validates them. In an embodiment, when invalid credentials are received by the key server 300, the latter may reject the corresponding request and respond to the user/subscriber interface 500 with an error or status message detailing reasons for which the authentication attempt was unsuccessful. As mentioned already, authentication can be done at a proxy or an active directory, e.g. using ADFS or using an identity provider (e.g. Google, Microsoft, Facebook, etc. . . . ).

Following a successful login attempt (in which authentication credentials presented by a user/subscriber are validated), the opportunity to request and obtain one or more cryptographic keys to obtain data stream content may be presented to a user/subscriber. It will be appreciated that in embodiments, the specific selection interface by which such a request may be presented, specified, selected, or otherwise formulated may vary. Said selection interface may be implemented by any combination of the key server 300, user/subscriber interface 500, and video archive server 400, further described herein.

In a non-limiting example, a selection menu may be presented to the user/subscriber. This menu may display metadata (such as name, file size, date, and type) associated with each of the various encrypted data feeds that may be accessed using the aforementioned credentials and for which one or more keys are owned by or otherwise accessible to a requesting user/subscriber. The possibility to further specify a starting and ending point to stream or transfer said one or more feeds may be further provided. The foregoing functionality may be implemented in an embodiment where the nature of the data streams 225, allows it (such as when the encrypted data feed to request corresponds to a video stream).

In another embodiment, the key server 300 may comprise, for each user/subscriber, one or more key streams 175 accessible to said user/subscriber. A set, sequence or series of key streams 175 may be grouped into a single-identifier logical container comprising a plurality of individual cryptographic key streams 175 assembled or otherwise bound together for a thematic purpose, such as to subsequently decrypt any portion or all of a feed 425 for which a particularly large number of cryptographic keys 275 has been generated 251.

The identifier of a key or key stream 175 to retrieve may in an embodiment be provided as a request to the key server 300, typically by the user/subscriber interface 500, upon successful validation of the aforementioned authentication credentials, or at any point during the ensuing session.

In response to a successful user/subscriber retrieval request by the key server 300 to serve the key stream, the key server 300 accepts the request and the corresponding key (stream) 175 is transmitted to the requesting user/subscriber's interface 500, which then accordingly receives 501 said key stream 275. Accordingly, the key server 300 provides the key or key stream 175 corresponding to the identifier requested. Likewise, the key server 300 simultaneously forwards 326 instructions to the video archive server 400 on the constituent file blocks, typically denoted using index numbers 325, to commence forwarding to the requesting user/subscriber's interface 500. A file block index 325 typically indicates the portion of an encrypted feed 425 to concurrently retrieve from the video archive server 400 and which is correspondingly decrypted by the current key being transmitted to the user/subscriber interface 500.

In embodiments, a plurality of key servers 300 may be deployed, in accordance with one or more strategic objectives of an implementation. Such objectives may comprise, for instance, the diversion or easing of congestion that would otherwise unduly tax a lone key server 300 such that the latter's performance would suffer, or alternatively to divert key serving duties or specific load to one or more alternate key servers 300 through the implementation of a specific traffic handling policy. The video archive server 400 receives encrypted data feeds 225 from the encryption module 200, in some embodiments upon initial upload of a stream 100. Implementation of the video archive server 400 need not be constrained by any consideration as to architecture, infrastructure, layout, or construction. The video archive server 400 outputs 426 encrypted data feeds 425 upon successful validation by the interface 500 of user/subscriber credentials, further described herein. An important part of the video archive server's 400 operation is its tandem interaction (see FIG. 3) with the key server 300, the latter of which issues to a requesting user/subscriber (once validated) the cryptographic keys 275 necessary to ultimately decrypt the incoming feeds 225 having been stored within the video archive server 400. It will thus be appreciated that for reasons flowing from the key-based architecture of embodiments described herein, the video archive server 400 need not be collocated with the key server 300. Likewise, the video archive server 400 need not be situated within close proximity to the key server 300 (nor even within any secured premises), as any potential attack, breach, or other compromising of the video archive server 400 alone should not result in danger or attendant vulnerability to the encrypted data feeds 225 that it 400 contains. In an embodiment, the video archive server 400 and key server 300 may thus be physically located on opposite sides of the globe. Furthermore, and owing to the cryptographic key embodiments (and, as exemplified and illustrated in FIG. 7, intermittently valid cryptographic key embodiments) described herein, the archive server 400 may be a publicly accessible FTP server, the encrypted nature of whose contents are all but unintelligible barring the possession of the correct corresponding cryptographic decryption key 275a. The pair of servers 300, 400 need only be linked, whether directly or interconnected through a network (such as the internet), so as to cooperate in fulfilling a user request 276a to serve the appropriate corresponding key stream 275, 275a to a successfully validated user/subscriber.

When a valid user/subscriber request is received from the interface 500 and its key or key stream 275, 275a retrieval operation (further discussed herein) is handled 279, 280 by the key server 300, a corresponding sequence of feed retrieval operations 326, 402, 426 are handled by the video archive server 400 (the latter sequence occurring in partial collaboration with the key server 300). During a successful feed retrieval operation 326, 402, 426, the video archive server 400 receives 326 the key index 325 from the key server 300. The index 325 issued 326 by the key server 300 may in a further embodiment comprise a command and/or contain any necessary identifiers to explicitly identify the encrypted feed 425 (or portion thereof) requested for retrieval and to be correspondingly decrypted using the current key 275a, both of which 425, 275a may be concurrently transmitted to the requesting user/subscriber interface 500, though they need not be concurrently transmitted, e.g. if using the synchronization technology described herein. In another embodiment, the index 325 request may be issued directly by the user/subscriber interface 500 to the video archive server 400, with concurrent independent validation 350 for said request being performed at the key server 300.

Once the encrypted feed to retrieve 425 has been identified and the indices 325 corresponding to the cryptographic keys or key streams 275a ascertained, the encrypted 425 feed is transmitted 426 from the video archive server 400 to the user/subscriber interface 500, the latter typically executing on a user-side user/subscriber's workstation. As described herein, in addition to the encrypted feed 425, the key 275a necessary to decrypt the entire feed (especially in situations where the feed 425 is finite), or alternatively a sequence or stream of keys 275a may be concurrently transmitted 280, 501, 426, 502 to the interface 500.

The transfer to a user/subscriber interface 500 of a sequential number of keys 275, each of which decrypts intermittent portions of an encrypted feed 425 may be desirable. Such intermittence is particularly valuable in cases or embodiments where a distinct key 275a is required to decrypt successive fragments or portions of a feed, such as a video stream (FIG. 7). As a further non-limiting example (FIG. 5), the control possibilities provided by the intermittent transfer of a plurality of keys 275 may likewise be leveraged in cases where discrete portions 425a or all of said corresponding video stream 425 should be censored in accordance with a specific policy. Non-limiting examples covered by such a policy may include scenes in a motion picture containing graphic or explicit content, time ranges or regions of interest within surveillance video, content classified by law enforcement, or for other, not exclusively video files (FIG. 8, FIG. 9) containing censored content.

With reference to FIG. 5, it will be appreciated that the key or key stream 275a cryptographically matched to all or discrete portions of encrypted feed 425a should be received at the user/subscriber interface 500 node with a sufficient time offset 555 or lead time to properly account for and accommodate the reception of said corresponding discrete portions of the feed 425a and operation of the decryption module 500 to ensure a timely production of a decrypted feed 575 for subsequent display 600. In another embodiment, an appropriate safeguard or buffering mechanism may be implemented to ensure that decryption and/or playback not commence before a significant proportion, both of a stream 425a and of its corresponding keys 275a, has been received at the user/subscriber interface node 500. Such an embodiment should ideally seek to guarantee—using, among others, progress estimation based on network behavior and user-side computing resources—that any remaining transfers (of any outstanding quantity both of keys 275, 275a and encrypted feeds 425, 425a) complete within a time window not exceeding the playback duration. When such timely delivery cannot be guaranteed, system-side steps may be taken to reduce adverse impact on the overall user/subscriber experience, such as delaying the handling of new requests from other user/subscribers, or shifting—temporarily or definitively—to a less bandwidth-intensive variant of the encrypted feed 425 requested.

In an embodiment, should a cryptographic key 275a for decrypting a specific segment or portion of a feed not be received at the interface (whether at all, or, in the case of (live) video playback, within a sufficient processing/handling time margin offset 555) for combination with the portion of the feed 425a to which said key applies, no decryption may take place—or alternatively none for the portion of the feed to which said missing cryptographic key 275a applies. This is particularly the case in one or more embodiments lacking implementation and support for the insufficient access privilege marker 288, further described for embodiments herein. Accordingly, for such embodiments, the corresponding portion of the feed may remain an encrypted and irrecoverable "patch". In an embodiment, undecryptable or undecipherable video will simply not be played back over the duration of said "patch"; for example, a blank screen or other appropriate placeholder, typically containing less information than the aforementioned marker 288, may be substituted. It will be further appreciated, particularly in light of the foregoing and of description provided at length herein, that for architectures contemplated herein, the archive server 400 may advantageously comprise a simple FTP server governed by a comparatively minimal security policy. Even the breach of a single key may potentially enable malicious user to decrypt a discrete portion 425a of an encrypted feed which in scenarios may comprise a minor breach—accounting for only a few seconds of video or a few paragraphs of rich-text content.

In another embodiment (particularly those in which the occurrence of aforementioned irrecoverable patches are to be avoided), key streams 275 may be preferred to the intermittent and timely issuance of individual cryptographic keys 275. Bulk transfers of keys 275 in streams may accordingly be preferred for various reasons, which may non-limitingly include: minimizing possible interruption in video stream playback, increasing efficiency or potential performance, or simply reducing the number of individual keys to be transferred.

As mentioned in the discussion for the various modules disclosed herein, the user/subscriber interface 500 may in embodiments be a minimalist client or a comprehensive application that executes at a user/subscriber's location and enables said user/subscriber to initiate (login to) and terminate (logout from) sessions, as well as any possible session-relevant interaction in-between. Such interactions may in embodiments non-limitingly include all functional possibilities discussed herein, such as uploading or transferring a data stream, specifying sharing policies, initiating transfer requests, and, most prominently, retrieving/receiving keys and/or key streams 175 and/or encrypted key streams 275 corresponding to an encrypted data feed to decrypt 425, receiving encrypted video feeds, and processing/decrypting the tandem cryptographic key and encrypted data feed into unencrypted and intelligible data for display 600. Following validated access to a specific feed 425 resident on the video archive server 400, the user/subscriber interface 500 may request retransmission from the archive server 400 of a part or all of said encrypted feed 425, as might be required to overcome poor network quality, by issuing one or more index 325 values associated with discrete portions of said encrypted feed.

The terms "user" and "subscriber" may be used interchangeably herein where roles of various parties overlap. When a user wishes to subscribe to a particular stream or content stored within the video archive server 400, he may request to be granted access to the key or stream of keys 175 or encrypted key stream 275 necessary to decrypt said content. He may do this via a node of a user/subscriber interface 500 to which he has access, which may provide a user interface to a selectable catalog or listing of available encrypted video feeds 425 stored within the video archive server 400, from which he may formulate a subscription request. Said request is securely transmitted from the user/subscriber interface 500 to the key server 300 for validation and approval. Upon approval, the subscriber may receive a key or stream of keys, for decrypting said encrypted feeds, and he may accordingly be said to have subscribes to said video. In a further embodiment, management-related tasks may be imparted to the user/subscriber interface 500 to ensure that the key (stream) for the matching encrypted feed remains current and/or valid. This is particularly important for encrypted feeds 425 whose corresponding key 175 are intermittently valid or even periodically changed. Any necessary re-requesting, refreshing, or updating of keys 175 and other attendant validation may be performed by a specific User/subscriber interface 500 and the key server 300. Should access to the keys 175 to decrypt a specific encrypted feed 425 be no longer permitted as a result of a specific policy, the requesting subscriber may be informed by way of an appropriate message within the user/subscriber interface 500.

In embodiments, individuals wishing to receive content 425 at a user/subscriber interface 500 (and having authorization consistent with a permissions policy to do so) may correctly be said to "subscribe" to one or more layers of content. This is particularly true for those individuals who are authorized to stream content 601, such as by receiving the cryptographic keys to decrypt the content. The temporal, contractual, and delimiting nature of a subscription is further enforced in embodiments where one or more cryptographic keys are valid to decrypt only a portion (e.g. time- or other quantity-limited segment, as in FIG. 12) of a stream and/or other file (see FIG. 13a and FIG. 13b) available for redistribution to one or more individuals.

Transactions involving the user/subscriber interface 500 thus typically require a login and/or authentication procedure and may be implemented using any suitable method known in the art, such as via a username/password pair. A successful transaction typically allows a user/subscriber to decrypt contents available on the video archive server 400 (or alternatively, for a live stream, received directly from the encryption computer system 31) that said user/subscriber is entitled to decrypt.

Successful authentication allows a user/subscriber interact with embodiments, including all actions relevant to cause said user/subscriber to retrieve encrypted feeds 425 and in other embodiments, to store them. When a file or stream is to be opened locally, the interface 500 decrypts the encrypted data feed 425, 425a that it receives from the cloud, and places it into the user/subscriber's locally-accessible memory for local opening and/or playback.

It will be appreciated that the password used by the interface 500 may be locally used for validating the identity of a user/subscriber. The password is likewise sent by the interface 500 to a separate, specially secure password server, so that any user/subscriber so authorized (i.e. by obtaining the key(s) 275 to which he may be entitled) may request a specific encrypted data feed 425 resident on the archive server 400 and be able to decrypt 551 and open or otherwise access 601 said feed.

Upon successful authentication, an encrypted data feed 425 may be served by the video archive server 400 to one (unicast) or to a plurality (multicast) of recipient users. In embodiments, each one of said plurality of recipient users requesting to decrypt 551 and access 601 a specific feed may be provided with the key or stream of keys 275 required to do so. It will be appreciated that in certain embodiments, a single key or stream of keys 275 may be generated by the key source 250 and be provided to a user/subscriber interface 500 to decrypt 551 a specific feed. In other embodiments, it may be useful or desirable to generate multiple keys or parallel sets of keys 275 to decrypt the same encrypted feed, rather than re-encrypt (potentially repeatedly) said feed using a different cryptographic key or key stream 275, even where when doing so might be technically feasible. Issuing/generating such a parallel set of keys 275 and transmitting them to users/subscribers from the key server 300 may be valuable, for instance, in devising and enforcing a flexible or more robust access policy. In doing so, a given key (stream) 275 may be issued to one group of authenticated recipient users and not another. This can provide a useful scheme by which to grant, revoke, or conditionally activate decryption access to specific sets of recipient users/subscribers. Such access policy differentiation may for example be desirable in cases where it is intended, on one hand, to provide one or more users/subscribers with access to an encrypted feed 425 with keys 275 that provide decryption capability for a given time period of a video (e.g. FIG. 7), or to portions of a file (e.g. FIG. 8, FIG. 9), and on the other, to provide other users/subscribers with a single key 275 for the entire feed.

Figure 11:
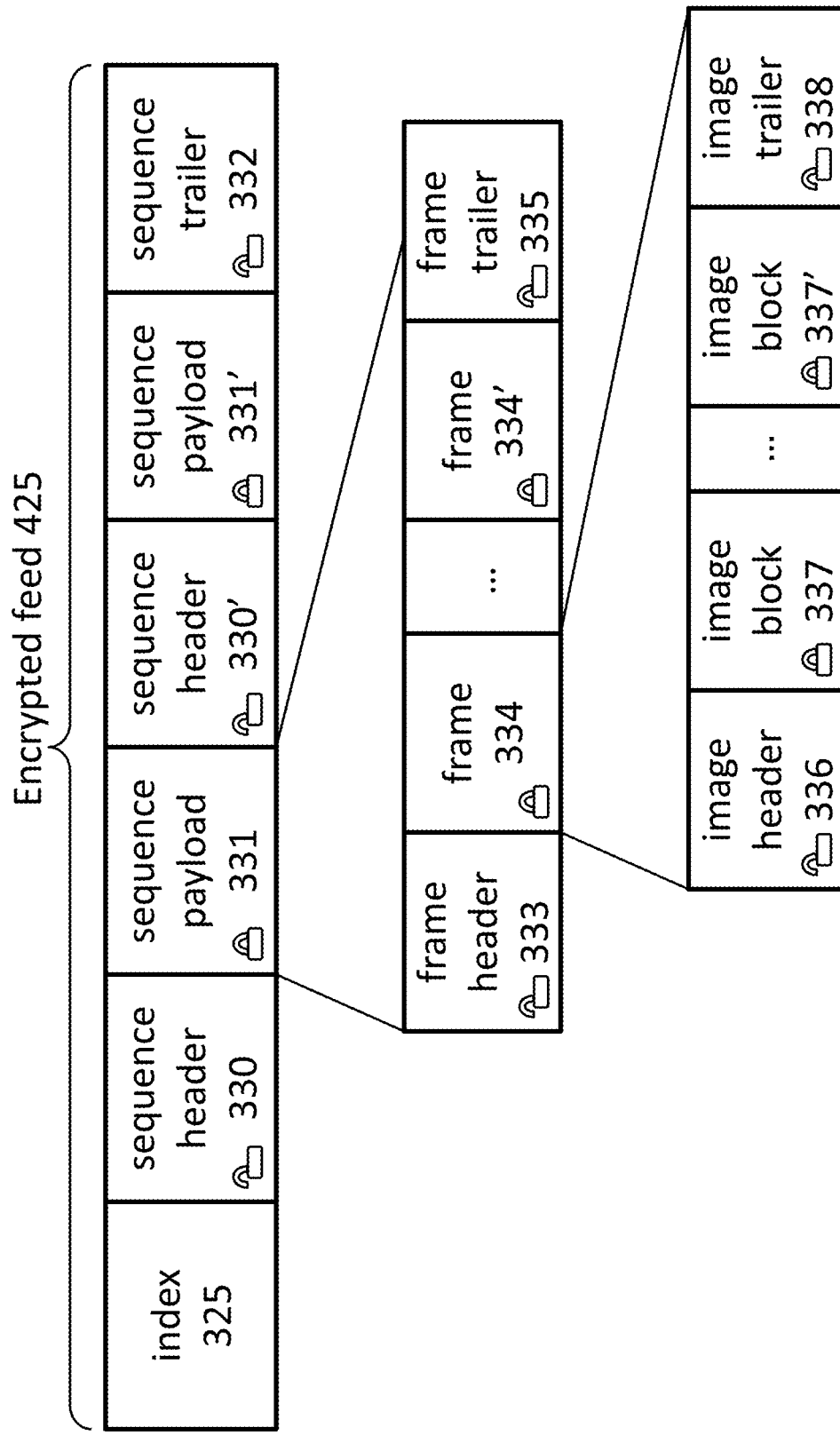
FIG. 11 is a bock diagram of a stream in accordance with a non-limiting example.

The aforementioned access policy differentiation may likewise be implemented in tandem with or distinct from any encryption scheme which may target only specific parts or layers of a bitstream (FIG. 11), as further discussed herein.

One non-limiting scenario of the foregoing access policy differentiation notion might feature an investigator who has been provided access to one or more security camera feeds from various coverage locations 25. The investigator accordingly works with the user/subscriber interface 500 assigned to him, with said interface 500 functioning as described substantially herein. His interface 500 might furthermore provide functionality allowing him to view, pause/freeze, and/or compare, correlate and/or playback frames captured by various cameras once decrypted locally. However, a rogue investigator may be tempted to abuse his position by stalking or otherwise observing movements of specific individuals captured by said sources 50 in a manner exceeding his prerogative. To counter such a possibility, the access policy implemented for all investigators might grant to the latter the ability to decrypt all frames collected from all video surveillance cameras within a given mandate or specific premises 25 and whose content is stored in the video archive server 400. Likewise, and in accordance with said mandate, the policy in place—and key (or keys 275) assigned to said security guard (or, alternatively, the network node corresponding to the specific user/subscriber interface 500 supplying or otherwise comprising his video wall) may limit him to decrypting and viewing only the surveillance video captured within the previous hour, or alternatively, from the start of said security guard's shift.

In another scenario, a video camera may be forbidden by law to gather surveillance footage from (or which partially includes) a public space. However, the security needs of an organization might strongly motivate the capture of said areas to preemptively ensure that any criminal offense or security-endangering incident may be captured and perpetrators identified and prosecuted. In such cases, an array of cameras 50 may capture 101 various streams 100, with the latter encrypted 201 by the encryption module 200 and the resulting encrypted feeds 225 transmitted 226 to the video archive server 400. The keys 275 for decrypting the encrypted feeds may be stored in a key server 300 and typically accessible only to law enforcement authorities whose role would be to investigate any incident relating to events captured (or potentially captured) from said streams 100. A variation on this scenario might involve providing said keys 275 to allow law enforcement personnel to view 601 a high-quality, high-bandwidth variant of a stream 575 (via a user/subscriber interface 500 specific to said law enforcement detachment), with keys for a lower-quality variant-which blurs the faces of passersby-provided to private security personnel assigned to a specific perimeter (with said private security personnel viewing feeds via a user/subscriber interface 500 specific to said private security personnel). In another embodiment, the 275 keys provided to law enforcement may be stored on a different key server 300 from those provided to private security personnel. Said distinct key servers 300 may in a still further embodiment have entirely different governance structures.

In a yet further embodiment, law enforcement may directly govern a key source 250 and key server 300. In such an embodiment, a key 275 may be briefly or ephemerally shared by law enforcement over a secure connection between the key server 300 (which may in this case comprise a key source 250) and the encryption module 200. During this sharing time window, the encryption module 200 converts a stream 100 to an encrypted video feed 225 and transmits it 225 to the video archive server 400.

Irrespective of whether a single or parallel set of valid keys 275 are generated and issued for a single encrypted feed, users may typically receive encrypted feeds from the video archive server 400. It will be appreciated that while in some embodiments it may be possible for a user/subscriber interface 500 to receive an encrypted feed directly from the encryption module 200, it is preferable, for architectural optimization, for encrypted streams—including video streams to be streamed live—to be stored within and issued from the video archive server 400 to a user/subscriber interface 500 (or to a plurality thereof), thus promoting a strict enforcement of each module's respective role(s). While doing so might in principle increase latency, (with said latency being particularly undesirable for feeds intended to be streamed live), structural and deployment efforts may be employed to minimize and compensate for such latency as to render such undesirable effects comparatively negligible.

A stricter enforcement of the roles of each module can likewise provide opportunities to concentrate operational liabilities by optimizing the functions and particularities specific to each module in addition to the interactions between modules. For example, the video archive server 400 must typically deal with receiving and particularly serving large volumes of data at a time. As a result, bandwidth considerations are of particular importance, especially with large numbers of user/subscriber interfaces 500 to which encrypted feeds must be transmitted concurrently. In this endeavor, it will be appreciated (with notable reference to FIG. 5) that ensuring that such transmission of feeds remains in synchronicity with the often contemporaneous (and in certain scenarios, intermittent) issuance of decryption keys 275 to said user/subscriber interfaces 500 while ensuring that a sufficient preemptive delay or time offset 555 separates the reception of a key 275a and the matching feed 425a to decrypt is an important consideration. Likewise, the key server 300 typically handles requests originating from numerous user/subscriber interfaces 500 located at various nodes within a network. The key server 300 must accordingly fulfill its operations, optimally doing so with minimal response time and latency. Given that the key server's 300 fulfilling of user authentication and granting key requests is on the whole a significantly less bandwidth-intensive process than the video archive server's 400 serving of encrypted feeds to users/subscribers, the former's 300 bandwidth-related needs are significantly less robust than the latter's 400.

It will further be appreciated that embodiments of topologies contemplated herein provide for optimal operational scenarios. The decoupling of storage from key management operations significantly reduces the liability—and compromising effects—of any accidental serving of (encrypted) data or breach of said (encrypted) data. A large part of the responsibility for maintaining integrity of data access is accordingly placed upon the user/subscriber interface 500, which is trusted. Furthermore, the decryption process undertaken by the decryption module resident at the user/subscriber interface 500 node, combined with storing keys and encrypted feeds at disparate locations and joining them in a decryption process at the node at which they are consumed provides for an architecture whose very topology is optimized for security and performance.

In another embodiment, a compositing of multiple streams may be desired. Compositing may be either destructive or non-destructive in nature. One example might comprise the possibility of blending the contents of multiple streams, such as one video layer and three audio layers to produce a new composited output. A user/subscriber may for instance be entitled to (i.e. have permission granted to obtain keys 175 for) each of the four said constituent layers and decrypt each of them at the user/subscriber interface 500 node. Following decryption, compositioning or blending of the four layers may be done on a processor that is local to the user/subscriber interface 500 (and appropriately trusted). It will be appreciated that the new stream 100 resulting from said compositioning may in turn be encrypted by the encryption module 200 which in an embodiment may be made accessible to the user/subscriber interface 500, for encryption. The requisite key(s) 275 would likewise be generated by the key source 250, with the resulting key(s) 275 stored within the key server 300, in accordance with functionality discussed at length herein.

In an embodiment, the user/subscriber interface 500 may provide functionality for the creation of new accounts. Deletion of accounts may likewise be implemented within a part of the interface 500, and, in a further embodiment, be the exclusive prerogative of a respective user or alternatively shared with a policy executed by service maintenance personnel.

It will be appreciated that the encryption module 200 and user/subscriber interface 500 may be combined into a single user-side application accessible on any platform, such as a personal computer or mobile platform. It will likewise be appreciated that in another series of embodiments, a single user/subscriber or account may be either allowed, forbidden, or limited in the number of multiple sessions that he may instantiate concurrently.

It will further be appreciated that implementations of possible embodiments, whether or not discussed herein, may depart somewhat from the description provided, particularly for purposes of scalability where the number of users/subscribers and/or the amount of data to store in the video archive server 400 reaches very large proportions. For example, the network or networks on which embodiments may be deployed may include, without limitation, a LAN, a WAN, and/or the internet. Although this technology is well suited for providing safe access to data over an untrusted network, it will be appreciated that where an untrusted network is used (e.g. where communication takes place over an untrusted network), a trusted network may be used instead. In such a case the present technology may still provide an additional layer of security as well as permission-based access control.

The computer readable storage media provided herein may be tangible computer readable storage media such as chip- or disk-based storage media and may be accessible by a processing entity such as a CPU.

Although the video archive server 70 was so named, this was mainly for convenience. It will be appreciated that it may represent a generic data stream archive server for storing data streams or more broadly data. Although a single encryption computer system 30 and video archive server 70 were shown here, it will be appreciated that multiple encryption computer systems may share a video archive server 70, or less typically vice versa. Moreover, both these entities may have redundant versions. A redundant encryption computer system may receive raw data streams like the original encryption computer system 30 and encrypt the data and/or key streams independently. Auxiliary archivers may be provided as a client to the video archive server 70 to store additional copies of encrypted data streams and/or encrypted key streams.

Thus it will be appreciated that the present technology allows for secure storage and transfer of data streams with differentiated permission access. The data streams may be very large or even unbounded/infinite and can be divided into finite segments arbitrarily or according to any suitable pattern. It should be understood, that portions of a stream are typically themselves streams. Thus what is said to be performed on a particular stream may be performed on only a part of the stream, the part on which it is performed being itself a stream. This should be evident, for example when discussing potentially infinite streams, where the presently described techniques may be applied to a portion thereof, which is itself a stream.

Symmetric encryption is efficient over large data sets, but involves sharing a secret key which leads to trust issues. Asymmetric encryption is not as efficient over large data set, but allows better control. The present technology provides the benefit of both these techniques by securing a large dataset with the security of asymmetric encryption and with roughly the efficiency of symmetric encryption by asymmetrically encrypting the symmetric keys with which the large dataset is encrypted.

The present technology also allows for effective handling of cloud trust issues since the data is encrypted both in storage and when transmitted. The central repository (e.g. cloud) does not have access to the unencrypted data and in one example is not able to grant new access permissions to new users by itself. A trusted agent is tasked with granting permission in a process that advantageously does not require direct access to the large dataset. Advantageously unencrypted copies of original data and symmetric keys need not be kept and are discarded for extra data safety.

Distribution and sharing of the data is scalable and sharing does not require decrypting of the data stream itself, only of the key stream. Moreover sharing and permission granting can be performed granularly on portions of a data stream or an entire set. The data stream is segmented into segments of a particular length (e.g. 1 minute of time) and each segment is encrypted with a random symmetric key (which together form a key stream) to create an encrypted data stream. This may be an ongoing process whereby a new symmetric key is created every time a new segment beings (e.g. every minute) and it is appended to the key stream. The key stream, or portions thereof, can be asymmetrically encrypted with the public key in the certificate of an authorized entity to produce an encrypted certificate-specific key stream which can be shared with the authorized entity (or safely stored and/or broadly distributed) to provide the authorized entity access to the corresponding portion of data stream.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

What is claimed is:

1. A method for controlling user access to streaming data over a network, comprising:
   a. receiving from a key generator a first symmetric encryption key stream comprising a first plurality of symmetric encryption keys for encrypting respective sequential portions of a first data stream to create a first symmetrically encrypted data stream comprising sequential portions of encrypted data;
   b. receiving at least one public asymmetric encryption key;
   c. determining, for each public asymmetric encryption key of the at least one public asymmetric encryption key, whether the public asymmetric encryption key is associated with a permission to access the first data stream by consulting one or more values indicative of a right to access the first data stream;
   d. selectively generating asymmetrically encrypted key stream data by digitally encrypting the first symmetric encryption key stream using each one of the at least one public asymmetric encryption key determined to be associated with the permission to access the first data stream to create one or more asymmetrically encrypted first key streams, wherein each respective one of the one or more asymmetrically encrypted first key streams is encrypted with a respective one of the at least one public asymmetric encryption key determined to be associated with the permission to access the first data stream, the asymmetrically encrypted key stream data comprising each of the one or more asymmetrically encrypted first key streams; and
   e. transmitting the asymmetrically encrypted key stream data over the network.

2. The method of claim 1, further comprising receiving over a trusted connection with a trusted source the first data stream; wherein the first symmetrically encrypted data stream is created at the encryption computer system by digitally encrypting with each of the first plurality of symmetric encryption keys the respective sequential portions of the first data stream.

3. The method of claim 1, wherein generating asymmetrically encrypted key stream data comprises synchronizing the first plurality of symmetric encryption keys with the respective sequential portions of encrypted data.

4. The method of claim 3, wherein synchronizing the first plurality of symmetric encryption keys with the respective sequential portions of encrypted data comprises providing in each of the one or more asymmetrically encrypted first key streams for each of the first plurality of symmetric encryption keys a temporal reference to the respective sequential portion of encrypted data.

5. The method of claim 1, further comprising:
   a. receiving from the key generator a second symmetric encryption key stream comprising a second plurality of symmetric encryption keys for encrypting respective sequential portions of a second data stream to create a second symmetrically encrypted data stream comprising sequential portions of encrypted data;
   b. determining for each public asymmetric encryption key of the at least one public asymmetric encryption key whether the public asymmetric encryption key is associated with a second permission to access the second data stream by consulting one or more second values indicative of a right to access the second data stream; and
   c. selectively generate second asymmetrically encrypted key stream data by digitally encrypting the second symmetric encryption key stream using each one of the at least one public asymmetric encryption key determined to be associated with the second permission to access the second data stream to create one or more asymmetrically encrypted second key streams, wherein each respective one of the one or more asymmetrically encrypted second key streams is encrypted with a respective one of the at least one public asymmetric encryption key determined to be associated with the permission to access the second data stream, the asymmetrically encrypted second key stream data comprising each of the one or more asymmetrically encrypted second key streams.

6. The method of claim 5, further comprising receiving the second data stream; wherein the second encrypted data stream is created by digitally encrypting with each of the second plurality of symmetric encryption keys the respective sequential portions of the second data stream.

7. The method of claim 1, further comprising:
   a. storing in a repository the asymmetrically encrypted key stream data; and
   b. in response to a request for the first data stream from a third party computer over the network, validating the request and transmitting a respective one of the one or more asymmetrically encrypted first key streams encrypted with a public key of the third party.

8. The method of claim 7, further comprising:
   a. storing in the repository the first symmetrically encrypted data stream; and
   b. in response to the request for the first data stream from the third party computer, also transmitting the first symmetrically encrypted data stream to the third party computer over the network.

9. The method of claim 7, wherein the repository is a remote repository located in the network.

10. The method of claim 7, wherein the repository is a trusted repository in a trusted network zone, the method further comprising: storing in a remote content server accessed over the network the first symmetrically encrypted data stream.

11. The method of claim 1, further comprising receiving the first symmetrically encrypted data stream over a trusted connection with a trusted source, the trusted source comprising the key generator, wherein the first symmetric encryption key stream is obtained from the trusted source over the trusted connection.

12. The method of claim 11, wherein the trusted source is a surveillance camera.

13. The method of claim 1, wherein the key generator is a program module executable by the encryption computer system, wherein receiving from a key generator a first symmetric encryption key stream comprises executing the key generator program module at the encryption computer system.

14. The method of claim 1, wherein the determining of whether the public asymmetric encryption key is associated with the permission comprises determining whether the permission to which the public asymmetric encryption key is associated comprises a first permission to access a first portion of the first data stream, and wherein the selectively generating of the asymmetrically encrypted key stream data comprises digitally encrypting a subset of the first plurality of symmetric encryption keys corresponding to the first portion of the first data stream.

15. An encryption computer system to control user access to streaming data over a network, the encryption computer system comprising computer-readable instructions stored in a non-transitory computer-readable storage medium comprising instructions for instructing a general-purpose processing unit to:
   a. receive from a key generator a first symmetric encryption key stream comprising a first plurality of symmetric encryption keys for encrypting respective sequential portions of a first data stream to create a first encrypted data stream comprising sequential portions of encrypted data;
   b. receive at least one public asymmetric encryption key;
   c. determine, for each public asymmetric encryption key of the at least one public asymmetric encryption key, whether the public asymmetric encryption key is associated with a permission to access the first data stream by consulting one or more values indicative of a right to access the first data stream;
   d. selectively generate asymmetrically encrypted key stream data by digitally encrypting the first symmetric encryption key stream using each one of the at least one public asymmetric encryption key determined to be associated with the permission to access the first data stream to create one or more asymmetrically encrypted first key streams, wherein each respective one of the one or more asymmetrically encrypted first key streams is encrypted with a respective one of the at least one public asymmetric encryption key, the asymmetrically encrypted key stream data comprising each of the one or more asymmetrically encrypted first key streams, wherein for each of the at least one public asymmetric encryption key, the encrypting the symmetric encryption key stream is performed selectively in response to a determination that the particular public asymmetric encryption key is associated with a permission to access the first data stream; and
   e. transmit the asymmetrically encrypted key stream data.

16. The encryption computer system of claim 15, further comprising computer-readable instructions stored in the non-transitory computer-readable storage medium for instructing the general-purpose processing unit to synchronize the first plurality of symmetric encryption keys with the respective sequential portions of encrypted data.

17. The encryption computer system of claim 15, further comprising computer-readable instructions stored in the non-transitory computer-readable storage medium for instructing the general-purpose processing unit to:
   a. receive from the key generator a second symmetric encryption key stream comprising a second plurality of symmetric encryption keys for encrypting respective sequential portions of a second data stream to create a second symmetrically encrypted data stream comprising sequential portions of encrypted data;
   b. determine for each public asymmetric encryption key of the at least one public asymmetric encryption key whether the public asymmetric encryption key is associated with a second permission to access the second data stream by consulting one or more second values indicative of a right to access the second data stream; and
   c. selectively generate second asymmetrically encrypted key stream data by digitally encrypting the second symmetric encryption key stream using each one of the at least one public asymmetric encryption key determined to be associated with the second permission to access the second data stream to create one or more asymmetrically encrypted second key streams, wherein each respective one of the one or more asymmetrically encrypted second key streams is encrypted with a respective one of the at least one public asymmetric encryption key determined to be associated with the permission to access the second data stream, the asymmetrically encrypted second key stream data comprising each of the one or more asymmetrically encrypted second key streams.

18. The encryption computer system of claim 15, further comprising computer-readable instructions stored in the non-transitory computer-readable storage medium for instructing the general-purpose processing unit to:
   a. store in a repository the asymmetrically encrypted key stream data; and
   b. in response to a request for the first data stream from a third party computer over the network, validate the request and transmitting a respective one of the one or more asymmetrically encrypted first key streams encrypted with a public key of the third party.

19. The encryption computer system of claim 15, further comprising computer-readable instructions stored in the non-transitory computer-readable storage medium for instructing the general-purpose processing unit to receive the first symmetrically encrypted data stream over a trusted connection with a trusted source, the trusted source comprising the key generator, wherein the first symmetric encryption key stream is obtained from the trusted source over the trusted connection.

20. The encryption computer system of claim 19, wherein the trusted source is a surveillance camera.

21. The encryption computer system of claim 15, wherein the instructions for instructing the general-purpose processing unit to determine whether the public asymmetric encryption key is associated with the permission comprise instructing the general-purpose processing unit to determine whether the permission to which the public asymmetric encryption key is associated comprises a first permission to access a first portion of the first data stream, and wherein the instructions for instructing the general-purpose processing unit to selectively generate of the asymmetrically encrypted key stream data comprise instructions for instructing the general-purpose processing unit to digitally encrypt a subset of the first plurality of symmetric encryption keys corresponding to the first portion of the first data stream.

\* \* \* \* \*